US008938468B2

(12) United States Patent
Morgan et al.

(10) Patent No.: US 8,938,468 B2
(45) Date of Patent: Jan. 20, 2015

(54) METHODS AND APPARATUS FOR FACILITATING DESIGN, SELECTION AND/OR CUSTOMIZATION OF LIGHTING EFFECTS OR LIGHTING SHOWS

(75) Inventors: Frederick Morgan, Canton, MA (US); Ihor Lys, La Jolla, CA (US); Ronald Joseph Antonius Van Den Oetelaar, Den Dungen (NL); Michael Van Hartskamp, Eindhoven (NL)

(73) Assignee: Koninklijkle Philips N.V., Eindhoven (NL)

( * ) Notice: Subject to any disclaimer, the term of this patent is extended or adjusted under 35 U.S.C. 154(b) by 646 days.

(21) Appl. No.: 12/810,535

(22) PCT Filed: Dec. 29, 2008

(86) PCT No.: PCT/IB2008/055569

§ 371 (c)(1),
(2), (4) Date: Sep. 24, 2010

(87) PCT Pub. No.: WO2009/087537

PCT Pub. Date: Jul. 16, 2009

(65) Prior Publication Data

US 2011/0035404 A1 Feb. 10, 2011

Related U.S. Application Data

(60) Provisional application No. 61/017,878, filed on Dec. 31, 2007.

(51) Int. Cl.
*G06F 17/30* (2006.01)
*H05B 37/02* (2006.01)

(52) U.S. Cl.
CPC .................................... *H05B 37/029* (2013.01)
USPC ..... 707/769; 439/425; 362/544; 707/E17.014

(58) Field of Classification Search
CPC ............ G06F 3/04817; G06F 11/1438; G06F 11/1441; G06F 17/30; G06F 17/30241; G06F 17/30528; G06F 17/30893; G06F 21/568; G06F 21/575; G06F 3/04815; G06F 3/0488; G06F 3/0686; G06F 9/4406; G06F 9/44
USPC ........................................... 439/425; 362/544
See application file for complete search history.

(56) References Cited

U.S. PATENT DOCUMENTS 4,947,302 A 8/1990 Callahan
5,769,527 A 6/1998 Taylor et al.

(Continued)

FOREIGN PATENT DOCUMENTS

JP 200759353 A 3/2007

*Primary Examiner* — Shyue Jiunn Hwa
(74) *Attorney, Agent, or Firm* — Meenakshy Chakravorty

(57) ABSTRACT

Methods and apparatus for facilitating a process of designing, selecting, and/or customizing lighting effects or lighting shows. A library of indexed (tagged) predefined lighting effects or shows is searched by a search engine, based upon information provided by a user/designer, to identify a set of effects or shows having attributes that are in some way related to the information provided by the user. The user is then presented with search results, i.e., a manageable subset of intelligently chosen lighting effects or shows, which may be ranked in terms of relevance, any one or more of which may be readily selected by the user. The user may select one or more effects or shows from the search results "as is" for execution by a lighting system, may combine one or more effects or shows from the search results, or may modify one or more effects or shows from the search results to refine some aspect of the effect(s)/show(s) in accordance with user preferences. In one exemplary implementation, the library of lighting effects/shows and/or the search engine may be hosted by a web site and accessible via the Internet.

21 Claims, 4 Drawing Sheets

(56) References Cited

U.S. PATENT DOCUMENTS

| | | | | |
|---|---|---|---|---|
| 6,016,038 | A | 1/2000 | Mueller et al. | |
| 6,144,797 | A * | 11/2000 | MacCormack et al. | 386/224 |
| 6,211,626 | B1 | 4/2001 | Lys et al. | |
| 6,777,891 | B2 | 8/2004 | Lys et al. | |
| 7,139,617 | B1 | 11/2006 | Morgan et al. | |
| 7,209,958 | B2 * | 4/2007 | Crookham et al. | 709/217 |
| 7,564,426 | B2 * | 7/2009 | Poor et al. | 345/48 |
| 7,775,457 | B2 * | 8/2010 | Schnuckle | 239/12 |
| 7,845,823 | B2 * | 12/2010 | Mueller et al. | 362/231 |
| 2004/0252486 | A1 | 12/2004 | Krause | |
| 2005/0128751 | A1 * | 6/2005 | Roberge et al. | 362/276 |
| 2005/0248299 | A1 | 11/2005 | Chemel et al. | |
| 2008/0137325 | A1 * | 6/2008 | Pastore | 362/16 |

* cited by examiner

METHODS AND APPARATUS FOR FACILITATING DESIGN, SELECTION AND/OR CUSTOMIZATION OF LIGHTING EFFECTS OR LIGHTING SHOWS

BACKGROUND

Light emitting diodes (LEDs) are semiconductor-based light sources traditionally employed in low-power instrumentation and appliance applications for indication purposes and are available in a variety of colors (e.g., red, green, yellow, blue, white), based on the types of materials used in their fabrication. This color variety of LEDs has been recently exploited to create novel LED-based light sources having sufficient light output for new space-illumination and direct view applications. For example, as discussed in U.S. Pat. No. 6,016,038, incorporated herein by reference, multiple differently colored LEDs may be combined in a lighting fixture having one or more internal microprocessors, wherein the intensity of the LEDs of each different color is independently controlled and varied to produce a number of different hues. In one example of such an apparatus, red, green, and blue LEDs are used in combination to produce literally hundreds of different hues from a single lighting fixture. Additionally, the relative intensities of the red, green, and blue LEDs may be computer controlled, thereby providing a programmable multi-channel light source, capable of generating any color and any sequence of colors at varying intensities and saturations, enabling a wide range of eye-catching lighting effects. Such LED-based light sources have been recently employed in a variety of fixture types and a variety of lighting applications in which variable color lighting effects are desired. Lighting systems employing multiple such light sources, and the effects they produce, can be controlled and coordinated through a network, wherein a data stream containing packets of information representing lighting commands is communicated to the lighting devices. Each of the lighting devices may register all of the packets of information passed through the system, but only respond to packets that are addressed to the particular device. Once a properly addressed packet of information arrives, the lighting device may read and execute the lighting commands. Based on the network controllability of such lighting systems, lighting programs may be authored for these systems which, when executed, generate a wide variety of lighting effects or "lighting shows" in any of a number of different environments.

In general, a "lighting effect" refers to one or more states of light that are perceived as an entity over some period of time. A lighting effect may include a single color of light (including generally white light) or multiple colors of light perceived simultaneously and/or in some sequence. A lighting effect may have one or more static and/or dynamic characteristics, and exemplary dynamic characteristics may relate to one or more of color, brightness, perceived transition speed, perceived motion, periodicity, and the like. A "lighting show" may comprise a single lighting effect having some finite duration that is executed once, repeated periodically in some prescribed fashion, or repeated indefinitely. A lighting show also may comprise a number of different lighting effects executed in sequence or simultaneously according to a wide variety of definable parameters. Lighting effects constituting a lighting show also may be packaged as "meta-effects" that include multiple temporally linked lighting effects. One or more lighting effects, or an entire lighting show, may be based on parameters that are definable by a designer/programmer, or based at least in part on predefined ("pre-packaged") lighting effects available for selection by the designer/programmer during the authoring process. Additionally, all or a portion of a lighting effect or lighting show may be based on graphics or animation data, as well as video signals, that are converted to lighting control information pursuant to designer/programmer instructions provided during the authoring process.

Lighting effects or lighting shows may be authored by a designer/programmer via a graphical user interface (GUI) coupled to one or more processors/computers which collectively serve as a "light system composer." Exemplary methods and systems for authoring lighting effects or shows are discussed in U.S. Pat. No. 7,139,617, and U.S. Patent Application Publication No. US-2005-0248299-A1, both of which are incorporated herein by reference. As discussed in these references, a lighting effect or lighting show may be encoded as a sequential list of lighting states and transitions between lighting states, or frames of color data with reference to some time base, as a lighting program, which is then communicated to a lighting controller; the lighting controller in turn may be configured to generate lighting commands for execution by one or more lighting units based on the lighting program representing the lighting effect or lighting show.

SUMMARY OF THE INVENTION

Applicants have recognized and appreciated that, in many situations, the design of lighting shows or lighting effects may be a challenging endeavor. Even to a skilled designer/programmer, achieving an aesthetically appealing result from significantly complex lighting system installations, as well as relatively simple installations, is not necessarily an intuitive or non-trivial process. In particular, generating visibly pleasing results from controllable lighting systems in some circumstances may entail appreciable design challenges, even when pre-packaged or predetermined lighting effects are available as starting templates for modification, or direct use, as constituent elements of a lighting show. Furthermore, the design of lighting shows or lighting effects often relies on complex mapping data, which establishes a link between a relative position of one or more lighting units available for generating a lighting show/effect and a network identifier (e.g., an address) for the lighting unit(s) in an actual lighting system installation. In many cases, compiling such mapping data itself requires specialized technical skills, in addition to the significant creative and programming effort involved in authoring lighting shows or lighting effects from a "blank slate."

In view of the foregoing, the present invention is directed generally to methods and apparatus for facilitating the process of designing, selecting, and/or customizing lighting effects or lighting shows. In various embodiments, methods and apparatus according to the present invention draw upon a library of indexed predefined lighting effects or lighting shows as a resource.

For example, in one embodiment, the library of effects or shows is searched via a search engine, based upon information provided by a user/designer ("user information"), to identify for the user a set of effects or shows having attributes that are in some way related to the information provided by the user. The search engine provides the user with search results, i.e., a manageable subset of intelligently chosen lighting effects or shows, which may be ranked in terms of relevance, any one or more of which may be readily selected by the user. In various aspects, the user may select one or more effects or shows from the search results "as is" for execution by a lighting system; alternatively, the user may combine one or more effects or shows from the search results, and/or modify one or more effects or shows from the search results to refine some aspect of the effect(s)/show(s) in accordance with user preferences. In one exemplary implementation, the library of lighting effects/shows and/or the search engine may be hosted by a web site and accessible via the Internet.

Accordingly, one embodiment of the present invention is directed to a method for facilitating design, selection and/or customization of at least one lighting effect. The method includes the steps of querying a user for input information (step A), and searching a plurality of indexed predefined lighting effects based at least in part on the input information, each lighting effect of the plurality of lighting effects having at least one searchable attribute associated therewith (step B). The latter step includes determining if at least one first searchable attribute associated with at least one first lighting effect of the plurality of lighting effects is related to the input information (B1); and, if so, identifying the at least one first lighting effect as at least one candidate lighting effect (B2). The method further includes providing output information comprising an identification of the at least one candidate lighting effect identified above (step C).

The method may further include the step of automatically determining at least one aspect of a lighting system available to generate the at least one lighting effect (step D), wherein the step B comprises searching the plurality of indexed predefined lighting effects based at least in part on the input information and the at least one aspect of the lighting system determined in step D. In many embodiments, the lighting system includes a plurality of lighting units, and, in some of these embodiments, the step D includes automatically determining a number of the lighting units, respective types of the lighting units, and/or a physical arrangement of the lighting units in an environment in which the at least one lighting effect is to be generated.

In some embodiments, the input information relates to at least one aspect of a lighting system available to generate the at least one lighting effect. For example, the lighting system may include a plurality of lighting units, and so the input information relates to a number of the lighting units, respective types of the lighting units, and/or a physical arrangement of the lighting units in an environment in which the at least one lighting effect is to be generated. In other embodiments, the input information is independent of any aspects of the lighting system.

In yet other embodiments, the input information relates to at least one aesthetic preference of the user regarding a characteristic of light to be generated in the at least one lighting effect. The at least one aesthetic preference may relate to at least one desired color of the light, a desired color palette or range of colors for the light, a desired dynamic characteristic of the light, and/or a desired mood to be created by the light.

In still other embodiments, the input information relates to at least one aspect of an environment or a physical space in which the at least one lighting effect is to be generated and/or to an occasion or an event for which the at least one lighting effect is to be generated.

In various embodiments of the invention, the at least one first searchable attribute mentioned above relates to:

i. a color content of light to be generated in the at least one first lighting effect;
ii. a color resolution of the light to be generated in the at least one first lighting effect;
iii. a color distribution or color spatial frequency of the light to be generated in the at least one first lighting effect;
iv. at least one dynamic temporal characteristic of the light to be generated in the at least one first lighting effect;
v. a viewing perspective of a viewer of the light to be generated in the at least one first lighting effect;
vi. at least one preferred object to be illuminated by the light to be generated in the at least one first lighting effect; and/or
vii. a geometric configuration of a plurality of lighting units suitable for generating the at least one first lighting effect, for example, a one-dimensional configuration, a two-dimensional configuration, a three-dimensional configuration, and a random configuration.

Also, the at least one first searchable attribute may relate to the at least one dynamic temporal characteristic of the light to be generated in the at least one first lighting effect, such that the at least one dynamic characteristic relates to an appearance of motion in the at least one first lighting effect.

Further, the at least one searchable attribute associated with each lighting effect of the plurality of indexed predefined lighting effects can be identified by at least one searchable tag, and, if so, the step B1 above includes determining if at least one first searchable tag associated with the at least one first lighting effect corresponds to at least some of the input information.

In many embodiments, the at least one first lighting effect determined in step B1 includes a plurality of first lighting effects, and step B2 includes identifying the plurality of first lighting effects as a plurality of candidate lighting effects, wherein the output information provided in step C comprises the identification of the plurality of candidate lighting effects. The method may further include the step of allowing the user to select and/or modify at least one desired candidate lighting effect from the plurality of candidate lighting effects, for example, by executing at least one lighting program so as to generate the at least one desired candidate lighting effect if selected by the user.

The at least one desired candidate lighting effect may include at least two desired candidate lighting effects, and, if so, the method further comprises allowing the user to combine the at least two desired candidate lighting effects.

In one specific embodiment of the invention, the method is an Internet-enabled method further comprising providing the plurality of indexed predefined lighting effects on a web site, wherein step A comprises receiving the input information from the user over the Internet; and step B comprises providing the output information to the user over the Internet. In some versions of this embodiment, step B can be performed via a search engine having access to the web site and step A can be performed via a wizard hosted by the web site.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources, fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K. Lower color temperatures generally indicate white light having a more significant red component or a "warmer feel," while higher color temperatures generally indicate white light having a more significant blue component or a "cooler feel."

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s).

An “LED-based lighting unit” refers to a lighting unit that includes one or more LED-based light sources as discussed above, alone or in combination with other non LED-based light sources. A “multi-channel” lighting unit refers to an LED-based or non LED-based lighting unit that includes at least two light sources configured to respectively generate different spectrums of radiation, wherein each different source spectrum may be referred to as a “channel” of the multi-channel lighting unit.

The term “controller” is used herein generally to describe various apparatus relating to the operation of one or more light sources. A controller can be implemented in numerous ways (e.g., such as with dedicated hardware) to perform various functions discussed herein. A “processor” is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as “memory,” e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms “program” or “computer program” are used herein in a generic sense to refer to any type of computer code (e.g., software or microcode) that can be employed to program one or more processors or controllers.

The term “addressable” is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term “addressable” often is used in connection with a networked environment (or a “network,” discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be “addressable” in that it is configured to selectively exchange data with (i.e., receive data from and/or transmit data to) the network, based, for example, on one or more particular identifiers (e.g., “addresses”) assigned to it.

The term “network” as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term “user interface” as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention. In the drawings.

DETAILED DESCRIPTION

Figure 1:
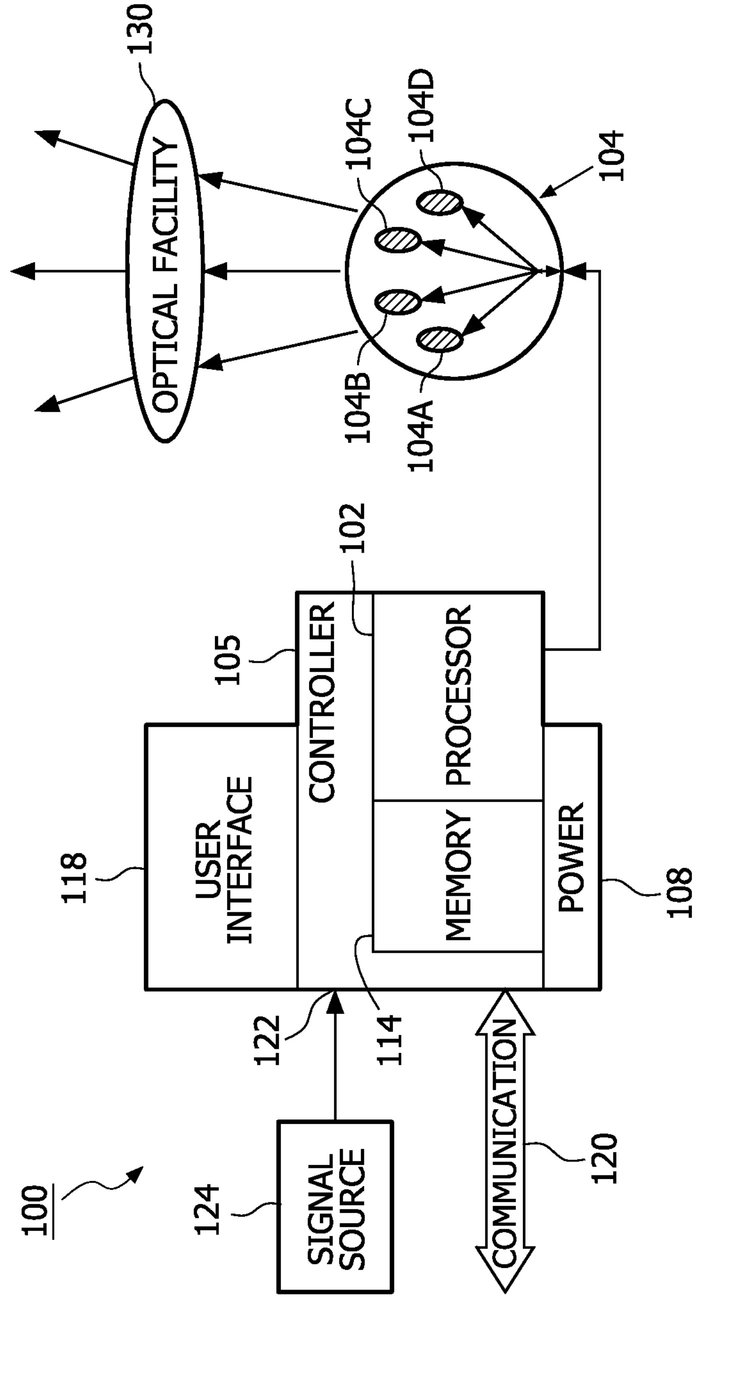
FIG. 1 is a generalized block diagram illustrating an LED-based lighting unit suitable for use in a lighting system according to various embodiments of the present invention.

Various aspects and embodiments of the present invention are described in detail below, including certain embodiments relating particularly to LED-based light sources. It should be appreciated, however, that the present invention is not limited to any particular manner of implementation, and that the various embodiments discussed explicitly herein are primarily for purposes of illustration. For example, the various concepts discussed herein may be suitably implemented in a variety of environments involving LED-based light sources, other types of light sources not including LEDs, environments that involve both LEDs and other types of light sources in combination, and environments that involve non-lighting-related devices alone or in combination with various types of light sources.

Applicants have recognized and appreciated that, in many situations, the design of lighting shows or lighting effects for computer-controllable LED-based lighting systems may be a challenging endeavor. Even to a skilled designer/programmer, achieving an aesthetically appealing result from significantly complex lighting system installations, as well as relatively simple installations, is not necessarily an intuitive or non-trivial process. Similar to desktop publishing or web page design, the nearly infinite range of options for lighting effects may be daunting to a person of little or no skill in designing lighting effects; thus, an ordinary user of a lighting system, and in some cases even a more advanced designer/programmer, may be deterred from designing lighting effects or may be generally disappointed in the lighting effects he or she generates. Furthermore, the design of lighting shows or lighting effects often relies on complex mapping data, which establishes a link between a relative position of one or more lighting units available for generating a lighting show or lighting effect and a network identifier (e.g., an address) for the lighting unit(s) in an actual installation. In many cases, compiling such mapping data itself requires specialized technical skills, in addition to the significant creative and programming effort of authoring lighting shows or lighting effects from a "blank slate."

In view of the foregoing, the present invention is directed generally to methods and apparatus for facilitating the process of designing, selecting, and/or customizing lighting effects or lighting shows. In various embodiments, methods and apparatus according to the present invention draw upon a library of indexed predefined lighting effects or lighting shows as a resource. For example, in one embodiment, a library of effects or shows is searched via a search engine, based upon information provided by a user/designer ("user information"), to identify for the user a set of effects or shows having attributes that are in some way related to the information provided by the user. The user is then presented with search results, i.e., a manageable subset of intelligently chosen lighting effects or shows, which may be ranked in terms of relevance, any one or more of which may be readily selected by the user. In other aspects, the user may select one or more effects or shows from the search results "as is" for execution by a lighting system; alternatively, the user may combine one or more effects or shows from the search results, and/or modify one or more effects or shows from the search results to refine some aspect of the effect(s)/show(s) in accordance with user preferences.

More specifically, in accordance with various embodiments of the present invention, in one aspect a customized search of a library of lighting effects or lighting shows may be based on a variety of information provided by the user including, but not limited to, various aesthetic preferences (e.g., color, color palette or range of colors; mood, intensity or energy, etc.), one or more aspects of the environment in which the lighting effect/show is to be generated (e.g., the physical space, the nature or purpose of an occasion or event, etc.), and aspects of the lighting system available to generate the lighting effect/show (e.g., number of lighting units, basic geometry or arrangement of lighting units, etc.). In another aspect, user information may be obtained via a "wizard," i.e., a user interface in which the user is led through a sequence of dialogues germane to obtaining relevant information for the search. In yet another aspect, each effect or show in the library is associated with one or more searchable tags corresponding to particular attributes of the effect/show. In this manner, the search engine may intelligently select effects or shows from the library based on some correspondence between the user information and the searchable tags associated with each effect/show in the library.

In one exemplary implementation, one or more of the library of lighting effects/shows, the wizard functionality, and the search engine may be hosted by a web site and accessible via the Internet. In yet other implementations, one or more (or all) functional aspects of a user interface (information input, display of search results, and effect/show selection and/or modification) and library searching may be performed by a controller that also controls the lighting system that generates the lighting effect(s)/show(s). Furthermore, the library of lighting effects/shows may be stored on such a controller, or stored external to the controller (e.g., in a dedicated storage system, on a server accessible via a network connection such as the Internet, etc.) and accessed by the controller as necessary to perform the search engine functions.

For purposes of the discussion herein with respect to the functionality of accepting input information from a user, searching, and presenting search results, lighting shows and lighting effects are treated similarly, and any functionality discussed in connection with the treatment of lighting effects should be understood to apply similarly to lighting shows.

To facilitate a discussion of methods and apparatus according to the present invention, an overview of exemplary LED-based lighting units and lighting systems for generating lighting effects and lighting shows is first provided.

FIG. 1 illustrates one example of a lighting unit 100 that may be employed in various embodiments of the present invention. Some general examples of LED-based lighting units similar to those that are described below in connection with FIG. 1 may be found, for example, in U.S. Pat. Nos. 6,016,038 and 6,211,626. In various embodiments of the present invention, the lighting unit 100 shown in FIG. 1 may be used alone or together with other similar lighting units in a system of lighting units (e.g., as discussed further below in connection with FIG. 2). Used alone or in combination with other lighting units, the lighting unit 100 may be employed in a variety of applications including, but not limited to, direct-view or indirect-view interior or exterior space (e.g., architectural) lighting and illumination in general, direct or indirect illumination of objects or spaces, theatrical or other entertainment-based/special effects lighting, decorative lighting, safety-oriented lighting, vehicular lighting, lighting associated with, or illumination of, displays and/or merchandise (e.g. for advertising and/or in retail/consumer environments), combined lighting or illumination and communication systems, etc., as well as for various indication, display and informational purposes.

Additionally, one or more lighting units similar to that described in connection with FIG. 1 may be implemented in a variety of products including, but not limited to, various forms of light modules or bulbs having various shapes and electrical/mechanical coupling arrangements (including replacement or "retrofit" modules or bulbs adapted for use in conventional sockets or fixtures), as well as a variety of consumer and/or household products (e.g., night lights, toys, games or game components, entertainment components or systems, utensils, appliances, kitchen aids, cleaning products, etc.) and architectural components (e.g., lighted panels for walls, floors, ceilings, lighted trim and ornamentation components, etc.).

Referring to FIG. 1, the lighting unit 100 includes one or more light sources 104A, 104B, 104C, and 104D (shown collectively as 104), wherein one or more of the light sources may be an LED-based light source that includes one or more LEDs. Any two or more of the light sources may be adapted to generate radiation of different colors (e.g. red, green, blue); in this respect, as discussed above, each of the different color light sources generates a different source spectrum that constitutes a different "channel" of a "multi-channel" lighting unit. Although FIG. 1 shows four light sources 104A, 104B, 104C, and 104D, it should be appreciated that the lighting unit is not limited in this respect, as different numbers and various types of light sources (all LED-based light sources, LED-based and non-LED-based light sources in combination, etc.) adapted to generate radiation of a variety of different colors, including essentially white light, may be employed in the lighting unit 100, as discussed further below.

Still referring to FIG. 1, the lighting unit 100 also includes a controller 105 configured to output one or more control signals to drive the light sources so as to generate various intensities of light from the light sources. For example, in one implementation, the controller 105 may be configured to output at least one control signal for each light source so as to independently control the intensity of light (e.g., radiant power in lumens) generated by each light source; alternatively, the controller 105 may be configured to output one or more control signals to collectively control a group of two or more light sources identically. Some examples of control signals that may be generated by the controller to control the light sources include, but are not limited to, pulse modulated signals, pulse width modulated signals (PWM), pulse amplitude modulated signals (PAM), pulse code modulated signals (PCM) analog control signals (e.g., current control signals, voltage control signals), combinations and/or modulations of the foregoing signals, or other control signals. In some versions, particularly in connection with LED-based sources, one or more modulation techniques provide for variable control using a fixed current level applied to one or more LEDs, so as to mitigate potential undesirable or unpredictable variations in LED output that may arise if a variable LED drive current were employed. In other versions, the controller 105 may control other dedicated circuitry (not shown in FIG. 1) which in turn controls the light sources so as to vary their respective intensities.

In general, the intensity (radiant output power) of radiation generated by the one or more light sources is proportional to the average power delivered to the light source(s) over a given time period. Accordingly, one technique for varying the intensity of radiation generated by the one or more light sources involves modulating the power delivered to (i.e., the operating power of) the light source(s). For some types of light sources, including LED-based sources, this may be accomplished effectively using a pulse width modulation (PWM) technique.

In one exemplary implementation of a PWM control technique, for each channel of a lighting unit a fixed predetermined voltage $V_{source}$ is applied periodically across a given light source constituting the channel. The application of the voltage $V_{source}$ may be accomplished via one or more switches, not shown in FIG. 1, controlled by the controller 105. While the voltage $V_{source}$ is applied across the light source, a predetermined fixed current $I_{source}$ (e.g., determined by a current regulator, also not shown in FIG. 1) is allowed to flow through the light source. Again, recall that an LED-based light source may include one or more LEDs, such that the voltage $V_{source}$ may be applied to a group of LEDs constituting the source, and the current $I_{source}$ may be drawn by the group of LEDs. The fixed voltage $V_{source}$ across the light source when energized, and the regulated current $I_{source}$ drawn by the light source when energized, determines the amount of instantaneous operating power $P_{source}$ of the light source ($P_{source}=V_{source}\cdot I_{source}$). As mentioned above, for LED-based light sources, using a regulated current mitigates potential undesirable or unpredictable variations in LED output that may arise if a variable LED drive current were employed.

According to the PWM technique, by periodically applying the voltage $V_{source}$ to the light source and varying the time the voltage is applied during a given on-off cycle, the average power delivered to the light source over time (the average operating power) may be modulated. In particular, the controller 105 may be configured to apply the voltage $V_{source}$ to a given light source in a pulsed fashion (e.g., by outputting a control signal that operates one or more switches to apply the voltage to the light source), preferably at a frequency that is greater than that capable of being detected by the human eye (e.g., greater than approximately 100 Hz). In this manner, an observer of the light generated by the light source does not perceive the discrete on-off cycles (commonly referred to as a "flicker effect"), but instead the integrating function of the eye perceives essentially continuous light generation. By adjusting the pulse width (i.e. on-time, or "duty cycle") of on-off cycles of the control signal, the controller varies the average amount of time the light source is energized in any given time period, and hence varies the average operating power of the light source. In this manner, the perceived brightness of the generated light from each channel in turn may be varied.

As discussed in greater detail below, the controller 105 may be configured to control each different light source channel of a multi-channel lighting unit at a predetermined average operating power to provide a corresponding radiant output power for the light generated by each channel. Alternatively, the controller 105 may receive instructions (e.g., "lighting commands") from a variety of origins, such as a user interface 118, a signal source 124, or one or more communication ports 120, that specify prescribed operating powers for one or more channels and, hence, corresponding radiant output powers for the light generated by the respective channels. By varying the prescribed operating powers for one or more channels (e.g., pursuant to different instructions or lighting commands), different perceived colors and brightness levels of light may be generated by the lighting unit.

In one embodiment of the lighting unit 100, as mentioned above, one or more of the light sources 104A, 104B, 104C, and 104D shown in FIG. 1 may include a group of multiple LEDs or other types of light sources (e.g., various parallel and/or serial connections of LEDs or other types of light sources) that are controlled together by the controller 105. Additionally, it should be appreciated that one or more of the light sources may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared. LEDs having a variety of spectral bandwidths (e.g., narrow band, broader band) may be employed in various implementations of the lighting unit 100.

The lighting unit 100 may be constructed and arranged to produce a wide range of variable color radiation. For example, in some embodiments, the lighting unit 100 may be particularly arranged such that controllable variable intensity (i.e., variable radiant power) light generated by two or more of the light sources combines to produce a mixed colored light (including essentially white light having a variety of color temperatures). In particular, the color (or color temperature) of the mixed colored light may be varied by varying one or more of the respective intensities (output radiant power) of the light sources, e.g., in response to one or more control signals output by the controller 105. Furthermore, the controller 105 may be particularly configured to provide control signals to one or more of the light sources so as to generate a variety of static or time-varying (dynamic) multi-color (or multi-color temperature) lighting effects. To this end, in various embodiments of the invention, the controller includes a processor 102 (e.g., a microprocessor) programmed to provide such control signals to one or more of the light sources. The processor 102 may be programmed to provide such control signals autonomously, in response to lighting commands, or in response to various user or signal inputs.

Thus, the lighting unit 100 may include a wide variety of colors of LEDs in various combinations, including two or more of red, green, and blue LEDs to produce a color mix, as well as one or more other LEDs to create varying colors and color temperatures of white light. For example, red, green and blue can be mixed with amber, white, UV, orange, IR or other colors of LEDs. Additionally, multiple white LEDs having different color temperatures (e.g., one or more first white LEDs that generate a first spectrum corresponding to a first color temperature, and one or more second white LEDs that generate a second spectrum corresponding to a second color temperature different than the first color temperature) may be employed, in an all-white LED lighting unit or in combination with other colors of LEDs. Such combinations of differently colored LEDs and/or different color temperature white LEDs in the lighting unit 100 can facilitate accurate reproduction of a host of desirable spectrums of lighting conditions, examples of which include, but are not limited to, a variety of outside daylight equivalents at different times of the day, various interior lighting conditions, lighting conditions to simulate a complex multicolored background, and the like. Other desirable lighting conditions can be created by removing particular pieces of spectrum that may be specifically absorbed, attenuated or reflected in certain environments. Water, for example tends to absorb and attenuate most non-blue and non-green colors of light, so underwater applications may benefit from lighting conditions that are tailored to emphasize or attenuate some spectral elements relative to others.

As also shown in FIG. 1, in various embodiments, the lighting unit 100 may include a memory 114 to store various items of information. For example, the memory 114 may be employed to store one or more lighting commands or programs for execution by the processor 102 (e.g., to generate one or more control signals for the light sources), as well as various types of data useful for generating variable color radiation (e.g., calibration information, discussed further below). The memory 114 also may store one or more particular identifiers (e.g., a serial number, an address, etc.) that may be used either locally or on a system level to identify the lighting unit 100. Such identifiers may be pre-programmed by a manufacturer, for example, and may be either alterable or non-alterable thereafter (e.g., via some type of user interface located on the lighting unit, via one or more data or control signals received by the lighting unit, etc.). Alternatively, such identifiers may be determined at the time of initial use of the lighting unit in the field, and again may be alterable or non-alterable thereafter.

Still referring to FIG. 1, the lighting unit 100 may also include one or more user interfaces 118 to facilitate any of a number of user-selectable settings or functions (e.g., generally controlling the light output of the lighting unit 100, changing and/or selecting various pre-programmed lighting effects to be generated by the lighting unit, changing and/or selecting various parameters of selected lighting effects, setting particular identifiers such as addresses or serial numbers for the lighting unit, etc.). In various embodiments, the communication between the user interface 118 and the lighting unit may be accomplished through wire or cable, or wireless transmission.

In one implementation, the controller 105 of the lighting unit monitors the user interface 118 and controls one or more of the light sources 104A, 104B, 104C and 104D based at least in part on a user's operation of the interface. For example, the controller 105 may be configured to respond to operation of the user interface by originating one or more control signals for controlling one or more of the light sources. Alternatively, the processor 102 may be configured to respond by selecting one or more pre-programmed control signals stored in memory, modifying control signals generated by executing a lighting program, selecting and executing a new lighting program from memory, or otherwise affecting the radiation generated by one or more of the light sources.

Still referring to FIG. 1, the lighting unit 100 may be configured to receive one or more signals 122 from one or more other signal sources 124. The controller 105 of the lighting unit may use the signal(s) 122, either alone or in combination with other control signals (e.g., signals generated by executing a lighting program, one or more outputs from a user interface, etc.), so as to control one or more of the light sources 104A, 104B, 104C and 104D in a manner similar to that discussed above in connection with the user interface.

Examples of the signal(s) 122 that may be received and processed by the controller 105 include, but are not limited to, one or more audio signals, video signals, power signals, various types of data signals, signals representing information obtained from a network (e.g., the Internet), signals representing one or more detectable/sensed conditions, signals from lighting units, signals consisting of modulated light, etc. In various implementations, the signal source(s) 124 may be located remotely from the lighting unit 100, or included as a component of the lighting unit. In one embodiment, a signal from one lighting unit 100 could be sent over a network to another lighting unit 100.

Some examples of a signal source 124 that may be employed in, or used in connection with, the lighting unit 100 of FIG. 1 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/light sensors (e.g., photodiodes, sensors that are sensitive to one or more particular spectra of electromagnetic radiation such as spectroradiometers or spectrophotometers, etc.), various types of cameras, sound or vibration sensors or other pressure/force transducers (e.g., microphones, piezoelectric devices), and the like.

Additional examples of a signal source 124 include various metering/detection devices that monitor electrical signals or characteristics (e.g., voltage, current, power, resistance, capacitance, inductance, etc.) or chemical/biological characteristics (e.g., acidity, a presence of one or more particular chemical or biological agents, bacteria, etc.) and provide one or more signals 122 based on measured values of the signals or characteristics. Yet other examples of a signal source 124 include various types of scanners, image recognition systems, voice or other sound recognition systems, artificial intelligence and robotics systems, and the like. A signal source 124 could also be a lighting unit 100, another controller or processor, or any one of many available signal generating devices, such as media players, MP3 players, computers, DVD players, CD players, television signal sources, camera signal sources, microphones, speakers, telephones, cellular phones, instant messenger devices, SMS devices, wireless devices, personal organizer devices, and many others.

Further, the lighting unit 100 shown in FIG. 1 may also include one or more optical elements or facilities 130 to optically process the radiation generated by the light sources 104A, 104B, 104C, and 104D. For example, one or more optical elements may be configured so as to change one or both of a spatial distribution and a propagation direction of the generated radiation. In particular, one or more optical elements may be configured to change a diffusion angle of the generated radiation. One or more optical elements 130 may be particularly configured to variably change one or both of a spatial distribution and a propagation direction of the generated radiation (e.g., in response to some electrical and/or mechanical stimulus). Examples of optical elements that may be included in the lighting unit 100 include, but are not limited to, reflective materials, refractive materials, translucent materials, filters, lenses, mirrors, and fiber optics. The optical element 130 also may include a phosphorescent material, luminescent material, or other material capable of responding to or interacting with the generated radiation.

As also shown in FIG. 1, the lighting unit 100 may include one or more communication ports 120 to facilitate coupling of the lighting unit 100 to any of a variety of other devices, including one or more other lighting units. For example, one or more communication ports 120 may facilitate coupling multiple lighting units together as a networked lighting system, in which at least some or all of the lighting units are addressable (e.g., have particular identifiers or addresses) and/or are responsive to particular data transported across the network. One or more communication ports 120 may also be adapted to receive and/or transmit data through wired or wireless transmission. In one embodiment, information received through the communication port may at least in part relate to address information to be subsequently used by the lighting unit, and the lighting unit may be adapted to receive and then store the address information in the memory 114 (e.g., the lighting unit may be adapted to use the stored address as its address for use when receiving subsequent data via one or more communication ports).

In particular, in a networked lighting system environment, as discussed in greater detail further below (e.g., in connection with FIG. 2), as data is communicated via the network, the controller 105 of each lighting unit coupled to the network may be configured to be responsive to particular data (e.g., lighting control commands) that pertain to it (e.g., in some cases, as dictated by the respective identifiers of the networked lighting units). Once a given controller identifies particular data intended for it, it may read the data and, for example, change the lighting conditions produced by its light sources according to the received data (e.g., by generating appropriate control signals to the light sources). The memory 114 of each lighting unit coupled to the network may be loaded, for example, with a table of lighting control signals that correspond with data the processor 102 of the controller receives. In these implementations, once the processor 102 receives data from the network, it then consult the table to select the control signals that correspond to the received data, and control the light sources of the lighting unit accordingly (e.g., using any one of a variety of analog or digital signal control techniques, including various pulse modulation techniques discussed above).

In many embodiments, the processor 102 of a given lighting unit, whether or not coupled to a network, is configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. In the DMX protocol, lighting instructions are transmitted to a lighting unit as control data that is formatted into packets including 512 bytes of data, in which each data byte is constituted by 8-bits representing a digital value of between zero and 255. These 512 data bytes are preceded by a “start code” byte. An entire “packet” including 513 bytes (start code plus data) is transmitted serially at 250 kbit/s pursuant to RS-485 voltage levels and cabling practices, wherein the start of a packet is signified by a break of at least 88 microseconds.

In the DMX protocol, each data byte of the 512 bytes in a given packet is intended as a lighting command for a particular “channel” of a multi-channel lighting unit, wherein a digital value of zero indicates no radiant output power for a given channel of the lighting unit (i.e., channel off), and a digital value of 255 indicates full radiant output power (100% available power) for the given channel of the lighting unit (i.e., channel full on). For example, in one aspect, considering for the moment a three-channel lighting unit based on red, green and blue LEDs (i.e., an “R-G-B” lighting unit), a lighting command in DMX protocol may specify each of a red channel command, a green channel command, and a blue channel command as eight-bit data (i.e., a data byte) representing a value from 0 to 255. The maximum value of 255 for any one of the color channels instructs the processor 102 to control the corresponding light source(s) to operate at maximum available power (i.e., 100%) for the channel, thereby generating the maximum available radiant power for that color (such a command structure for an R-G-B lighting unit commonly is referred to as 24-bit color control). Hence, a command of the format [R, G, B]=[255, 255, 255] would cause the lighting unit to generate maximum radiant power for each of red, green and blue light (thereby creating white light).

Thus, a given communication link employing the DMX protocol conventionally can support up to 512 different lighting unit channels. A given lighting unit designed to receive communications formatted in the DMX protocol generally is configured to respond to only one or more particular data bytes of the 512 bytes in the packet corresponding to the number of channels of the lighting unit (e.g., in the example of a three-channel lighting unit, three bytes are used by the lighting unit), and ignore the other bytes, based on a particular position of the desired data byte(s) in the overall sequence of the 512 data bytes in the packet. To this end, DMX-based lighting units may be equipped with an address selection mechanism that may be manually set by a user/installer to determine the particular position of the data byte(s) that the lighting unit responds to in a given DMX packet.

It should be appreciated, however, that lighting units suitable for purposes of the present disclosure are not limited to a DMX command format, as lighting units according to various embodiments may be configured to be responsive to other types of communication protocols/lighting command formats so as to control their respective light sources. In general, the processor 102 may be configured to respond to lighting commands in a variety of formats that express prescribed operating powers for each different channel of a multi-channel lighting unit according to some scale representing zero to maximum available operating power for each channel.

For example, in other embodiments, the processor 102 of a given lighting unit is configured to interpret lighting instructions/data that are received in a conventional Ethernet protocol (or similar protocol based on Ethernet concepts). Ethernet is a well-known computer networking technology often employed for local area networks (LANs) that defines wiring and signaling requirements for interconnected devices forming the network, as well as frame formats and protocols for data transmitted over the network. Devices coupled to the network have respective unique addressees, and data for one or more addressable devices on the network is organized as packets. Each Ethernet packet includes a "header" that specifies a destination address (to where the packet is going) and a source address (from where the packet came), followed by a "payload" including several bytes of data (e.g., in Type II Ethernet frame protocol, the payload may be from 46 data bytes to 1500 data bytes). A packet concludes with an error correction code or "checksum." As with the DMX protocol discussed above, the payload of successive Ethernet packets destined for a given lighting unit configured to receive communications in an Ethernet protocol may include information that represents respective prescribed radiant powers for different available spectra of light (e.g., different color channels) capable of being generated by the lighting unit.

In yet another embodiment, the processor 102 of a given lighting unit may be configured to interpret lighting instructions/data that are received in a serial-based communication protocol as described, for example, in U.S. Pat. No. 6,777,891. In particular, according to one embodiment based on a serial-based communication protocol, multiple lighting units 100 are coupled together via their communication ports 120 to form a series connection of lighting units (e.g., a daisy-chain or ring topology), wherein each lighting unit has an input communication port and an output communication port. Lighting instructions/data transmitted to the lighting units are arranged sequentially based on a relative position in the series connection of each lighting unit. It should be appreciated that while a lighting network based on a series interconnection of lighting units is discussed particularly in connection with an embodiment employing a serial-based communication protocol, the disclosure is not limited in this respect, as other examples of lighting network topologies contemplated by the present disclosure are discussed further below in connection with FIG. 2.

In some exemplary implementations of the embodiment employing a serial-based communication protocol, as the processor 102 of each lighting unit in the series connection receives data, it "strips off" or extracts one or more initial portions of the data sequence intended for it and transmits the remainder of the data sequence to the next lighting unit in the series connection. For example, again considering a serial interconnection of multiple three-channel (e.g., "R-G-B") lighting units, three multi-bit values (one multi-bit value per channel) are extracted by each three-channel lighting unit from the received data sequence. Each lighting unit in the series connection in turn repeats this procedure, namely, stripping off or extracting one or more initial portions (multi-bit values) of a received data sequence and transmitting the remainder of the sequence. The initial portion of a data sequence stripped off in turn by each lighting unit may include respective prescribed radiant powers for different available spectra of light (e.g., different color channels) capable of being generated by the lighting unit. As discussed above in connection with the DMX protocol, in various implementations each multi-bit value per channel may be an 8-bit value, or other number of bits (e.g., 12, 16, 24, etc.) per channel, depending in part on a desired control resolution for each channel.

In yet another exemplary implementation of a serial-based communication protocol, rather than stripping off an initial portion of a received data sequence, a flag is associated with each portion of a data sequence representing data for multiple channels of a given lighting unit, and an entire data sequence for multiple lighting units is transmitted completely from lighting unit to lighting unit in the serial connection. As a lighting unit in the serial connection receives the data sequence, it looks for the first portion of the data sequence in which the flag indicates that a given portion (representing one or more channels) has not yet been read by any lighting unit. Upon finding such a portion, the lighting unit reads and processes the portion to provide a corresponding light output, and sets the corresponding flag to indicate that the portion has been read. Again, the entire data sequence is transmitted completely from lighting unit to lighting unit, wherein the state of the flags indicate the next portion of the data sequence available for reading and processing.

In one particular embodiment relating to a serial-based communication protocol, the controller 105 a given lighting unit configured for a serial-based communication protocol may be implemented as an application-specific integrated circuit (ASIC) designed to specifically process a received stream of lighting instructions/data according to the "data stripping/extraction" process or "flag modification" process discussed above. More specifically, in one exemplary embodiment of multiple lighting units coupled together in a series interconnection to form a network, each lighting unit includes an ASIC-implemented controller 105 having the functionality of the processor 102, the memory 114 and communication port(s) 120 shown in FIG. 1 (optional user interface 118 and signal source 124 of course need not be included in some implementations). Such an implementation is discussed in detail in U.S. Pat. No. 6,777,891.

The lighting unit 100 of FIG. 1 may include and/or be coupled to one or more power sources 108. In various embodiments, examples of power source(s) 108 include, but are not limited to, AC power sources, DC power sources, batteries, solar-based power sources, thermoelectric or mechanical-based power sources and the like. Additionally, the power source(s) 108 may include or be associated with one or more power conversion devices or power conversion circuitry (e.g., in some cases internal to the lighting unit 100) that convert power received by an external power source to a form suitable for operation of the various internal circuit components and light sources of the lighting unit 100.

The controller 105 of the lighting unit 100 may be configured to accept a standard A.C. line voltage from the power source 108 and provide appropriate D.C. operating power for the light sources and other circuitry of the lighting unit based on concepts related to DC-DC conversion, or "switching" power supply concepts, as discussed in, for example, U.S. Pat. No. 7,233,115. In some versions of these implementations, the controller 105 may include circuitry to not only accept a standard A.C. line voltage but to ensure that power is drawn from the line voltage with a significantly high power factor.

While not shown explicitly in FIG. 1, the lighting unit 100 may be implemented in any one of several different structural configurations according to various embodiments of the present disclosure. Examples of such configurations include, but are not limited to, an essentially linear or curvilinear configuration, a circular configuration, an oval configuration, a rectangular configuration, combinations of the foregoing, various other geometrically shaped configurations, various two or three dimensional configurations, and the like.

A given lighting unit also may have any one of a variety of mounting arrangements for the light source(s), enclosure/housing arrangements and shapes to partially or fully enclose the light sources, and/or electrical and mechanical connection configurations. In particular, in some implementations, a lighting unit may be configured as a replacement or "retrofit" to engage electrically and mechanically in a conventional socket or fixture arrangement (e.g., an Edison-type screw socket, a halogen fixture arrangement, a fluorescent fixture arrangement, etc.).

Additionally, one or more optical elements as discussed above may be partially or fully integrated with an enclosure/housing arrangement for the lighting unit. Furthermore, the various components of the lighting unit discussed above (e.g., processor, memory, power, user interface, etc.), as well as other components that may be associated with the lighting unit in different implementations (e.g., sensors/transducers, other components to facilitate communication to and from the unit, etc.) may be packaged in a variety of ways; for example, any subset or all of the various lighting unit components, as well as other components that may be associated with the lighting unit, may be packaged together. Packaged subsets of components may be coupled together electrically and/or mechanically in a variety of manners.

Figure 2:
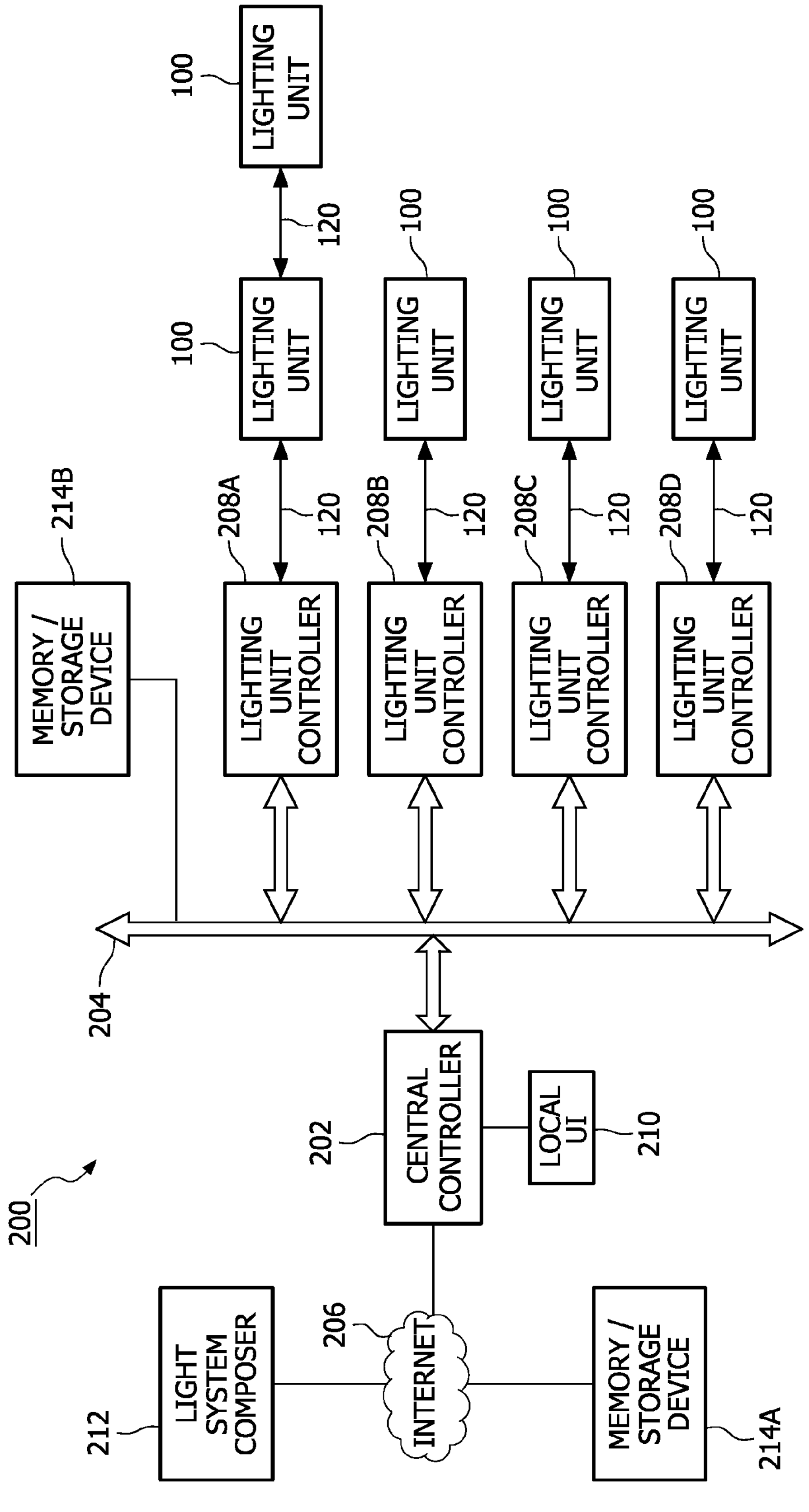
FIG. 2 is a generalized block diagram illustrating a networked system of lighting units according to one embodiment of the present invention.

FIG. 2 illustrates an example of a networked lighting system 200 according to various embodiments of the present invention, wherein a number of lighting units 100, similar to those discussed above in connection with FIG. 1, are coupled together to form the networked lighting system. It should be appreciated, however, that the particular configuration and arrangement of lighting units shown in FIG. 2 is for purposes of illustration only, and that the present invention is not limited to the particular system topology shown in FIG. 2.

Additionally, while not shown explicitly in FIG. 2, it should be appreciated that the networked lighting system 200 may be configured flexibly to include one or more user interfaces, as well as one or more signal sources such as sensors/transducers. For example, one or more user interfaces and/or one or more signal sources such as sensors/transducers (as discussed above in connection with FIG. 1) may be associated with any one or more of the lighting units of the networked lighting system 200. Alternatively (or in addition to the foregoing), one or more user interfaces and/or one or more signal sources may be implemented as "stand alone" components in the networked lighting system 200. Whether stand alone components or particularly associated with one or more lighting units 100, these devices may be "shared" by the lighting units of the networked lighting system. Stated differently, one or more user interfaces and/or one or more signal sources such as sensors/transducers may constitute "shared resources" in the networked lighting system that may be used in connection with controlling any one or more of the lighting units of the system.

Referring to FIG. 2, in some embodiments, the lighting system 200 includes one or more lighting unit controllers (hereinafter "LUCs") 208A, 208B, 208C, and 208D, wherein each LUC is responsible for communicating with and generally controlling one or more lighting units 100 coupled to it. Although FIG. 2 illustrates two lighting units 100 coupled to the LUC 208A, and one lighting unit 100 coupled to each LUC 208B, 208C and 208D, it should be appreciated that the invention is not limited in this respect, as different numbers of lighting units 100 may be coupled to a given LUC in a variety of different configurations (serially connections, parallel connections, combinations of serial and parallel connections, etc.) using a variety of different communication media and protocols.

In the system of FIG. 2, each LUC in turn may be coupled to a central controller 202 that is configured to communicate with one or more LUCs. Although FIG. 2 shows four LUCs coupled to the central controller 202 via a generic connection 204 (which may include any number of a variety of conventional coupling, switching and/or networking devices), it should be appreciated that according to various embodiments, different numbers of LUCs may be coupled to the central controller 202. Additionally, according to various embodiments of the present invention, the LUCs and the central controller may be coupled together in a variety of configurations using a variety of different communication media and protocols to form the networked lighting system 200. Moreover, it should be appreciated that the interconnection of LUCs and the central controller, and the interconnection of lighting units to respective LUCs, may be accomplished in different manners (e.g., using different configurations, communication media, and protocols).

For example, the central controller 202 shown in FIG. 2 may by configured to implement Ethernet-based communications with the LUCs, and in turn the LUCs may be configured to implement one of Ethernet-based, DMX-based, or serial-based protocol communications with the lighting units 100 (as discussed above, exemplary serial-based protocols suitable for various network implementation are discussed in detail in U.S. Pat. No. 6,777,891). In particular, in one embodiment, each LUC may be configured as an addressable Ethernet-based controller and accordingly may be identifiable to the central controller 202 via a particular unique address (or a unique group of addresses and/or other identifiers) using an Ethernet-based protocol. In this manner, the central controller 202 may be configured to support Ethernet communications throughout the network of coupled LUCs, and each LUC may respond to those communications intended for it. In turn, each LUC may communicate lighting control information to one or more lighting units coupled to it, for example, via an Ethernet, DMX, or serial-based protocol, in response to the Ethernet communications with the central controller 202 (wherein the lighting units are appropriately configured to interpret information received from the LUC in the Ethernet, DMX, or serial-based protocols).

The LUCs 208A, 208B, and 208C shown in FIG. 2 may be configured to be "intelligent" in that the central controller 202 may be configured to communicate higher level commands to the LUCs that need to be interpreted by the LUCs before lighting control information can be forwarded to the lighting units 100. For example, a lighting system operator may want to generate a color-changing effect that varies colors from lighting unit to lighting unit in such a way as to generate the appearance of a propagating rainbow of colors ("rainbow chase"), given a particular placement of lighting units with respect to one another. In this example, the operator may provide a simple instruction to the central controller 202 to accomplish this, and in turn the central controller may communicate to one or more LUCs using an Ethernet-based protocol high level command to generate a "rainbow chase." The command may contain timing, intensity, hue, saturation or other relevant information, for example. When a given LUC receives such a command, it may then interpret the command and communicate further commands to one or more lighting units using any one of a variety of protocols (e.g., Ethernet, DMX, serial-based), in response to which the respective sources of the lighting units are controlled via any of a variety of signaling techniques (e.g., PWM).

Further, one or more LUCs of a lighting network may be coupled to a series connection of multiple lighting units 100 (e.g., see LUC 208A of FIG. 2, which is coupled to two series-connected lighting units 100). In one embodiment, each LUC coupled in this manner is configured to communicate with the multiple lighting units using a serial-based communication protocol, examples of which were discussed above.

More specifically, in one exemplary implementation, a given LUC may be configured to communicate with a central controller 202, and/or one or more other LUCs, using an Ethernet-based protocol, and in turn communicate with the multiple lighting units using a serial-based communication protocol. In this manner, a LUC may be viewed in one sense as a protocol converter that receives lighting instructions or data in the Ethernet-based protocol, and passes on the instructions to multiple serially-connected lighting units using the serial-based protocol. Of course, in other network implementations involving DMX-based lighting units arranged in a variety of possible topologies, it should be appreciated that a given LUC similarly may be viewed as a protocol converter that receives lighting instructions or data in the Ethernet protocol, and passes on instructions formatted in a DMX protocol.

It should again be appreciated that the foregoing example of using multiple different communication implementations (e.g., Ethernet/DMX) in a lighting system according to one embodiment of the present invention is for purposes of illustration only, and that the invention is not limited to this particular example.

From the foregoing, it may be appreciated that one or more lighting units as discussed above are capable of generating highly controllable variable color light over a wide range of colors, as well as variable color temperature white light over a wide range of color temperatures.

In another aspect, the central controller 202 may be configured to be coupled to and communicate with the communication network 206 via a standard Internet Protocol to facilitate file transfer and access to web sites and other documents (e.g., linked by hyperlinks and URLs) constituting the World Wide Web. The communication network 206 may be any suitable communication network comprising any one or more wired and/or wireless communication media, including the Internet. In yet another aspect, the central controller 202 may be implemented as a general computing apparatus (e.g., a personal computer) and associated with a local user interface 210, which may include conventional computer peripherals such as one or more output devices (e.g., a screen display or graphical user interface) and/or one or more input devices (e.g., a keyboard and/or mouse). In yet another aspect, the central controller 202 may include a web browser, and a constituent element of the user interface functionality may be implemented as a Hypertext Markup Language (HTML) page retrieved by the web browser and displayed on an output device of the user interface 210. In other implementations, the central controller 202 may not necessarily be associated with a local user interface and may be configured to be accessed remotely through a wired and/or wireless network connection (e.g., via the connection 204 and/or the Internet 206) to another computing apparatus having a user interface, a user interface associated with one or more of the lighting units 100 (as discussed above in connection with FIG. 1), or a remote "stand-alone" user interface.

Based on the network controllability of the lighting system 200 of FIG. 2, lighting programs may be authored which, when executed by the central controller 202, cause one or more of the various lighting units 100 to generate one or more lighting effects or lighting shows. Exemplary methods and systems for designing such lighting programs are discussed in U.S. Pat. No. 7,139,617, and U.S. Patent Application Publication No. US-2005-0248299-A1. Lighting effects or lighting shows may be authored by a designer/programmer via a graphical user interface (GUI) coupled to one or more processors/computers which collectively serve as a "light system composer." In one aspect, a light system composer may encode an authored lighting effect or lighting show as a sequential list of lighting states and transitions between lighting states, or frames of color data with reference to some time base, to provide a lighting program that may be executed by the central controller 202 to generate lighting commands for one or more lighting units 100 of the lighting system 200.

In one implementation, a light system composer may form an integral part of the central controller 202 (and associated local user interface 210); in other implementations, as illustrated for example in FIG. 2, a light system composer 212 may be implemented as a separate entity from the central controller 202. For purposes of illustration, a separate light system composer 212 is illustrated in FIG. 2 as being coupled to the Internet 206; however, it should be appreciated that a separate light system composer alternatively may be coupled to the central controller 202 via the network connection 204 or another (e.g., direct) connection. From a separate light system composer, authored effects or shows in the form of executable lighting programs may be downloaded to the central controller (e.g., via the connection 204, a direct connection, and/or the Internet 206) for execution by the central controller.

In other aspects, authored effects or shows (whether authored via a light system composer integral to the central controller 202 or a separate light system composer) may be stored in a storage facility/memory included in the central controller 202 or external to the central controller (e.g., a storage facility 214A coupled to the Internet and/or an Ethernet-based storage facility 214B coupled to the connection 204). Once stored on an external storage facility 214A/214B, authored effects or shows may be transmitted from the external storage facility 214A/214B to the central controller 202 at any time for execution and/or internal storage by the central controller.

In some embodiments of the invention, transmissions of information from one or more external storage facilities 214A/214B (hereafter referred to in the singular for simplicity) to the central controller 202 may comprise executable lighting programs to generate the authored effects or shows. In alternative embodiments of the invention, however, rather than transmitting the authored effects or shows themselves (i.e., the executable lighting programs which generate the authored effects/shows), an external storage facility 214A/214B may transmit to the central controller 202 (unilaterally or in response to a request from the central controller 202) indications of one or more authored effects or shows which are available for transmission. For example, in a transmission from the external storage facility 214A/214B to the central controller 202 the indications may comprise information about one or more authored effects or shows such as characteristics of the one or more authored effects or shows. The central controller 202 may then use the information in the transmission to select one or more of the authored effects or shows for which the executable lighting programs should be retrieved from the external storage facility 214A/214B. The central controller 202 may then transmit to the external storage facility 214A/214B an indication of the selection, and the external storage facility 214A/214B in response then transmits the executable lighting program(s) for the selected one or more authored effects or shows.

Authored lighting effects or shows—referred to collectively henceforth for simplicity as lighting effects—and/or indications thereof may be transmitted from the external storage facility 214A/214B to the central controller 202 in any suitable fashion in response to any suitable condition. For example, the lighting effects may be sent from the external storage facility 214A/214B to the central controller 202 without a request from the central controller 202. Such a unilateral transmission may be implemented in any suitable manner, including as a periodic transmission. A periodic transmission may be a transmission sent at a regular interval (e.g., once per day, once per month, etc.) containing one or more lighting effects such as all effects/shows which had been stored in the external storage facility 214A/214B since the last transmission to the central controller 202, one or more lighting effects distinguished as special in some manner (e.g., a special effect or show of the day/month/etc.), or any other suitable set of one or more lighting effects. A unilateral transmission may also be implemented as a synchronization transmission serving to update information stored by the central controller 202 when similar information is added or edited on the external storage facility 214A/214B (e.g., transmitting a new authored effect or show to the central controller 202 when the new lighting effects is added to the external storage facility 214A/214B to maintain information parity between the external storage facility 214A/214B and the central controller 202), and/or in any other suitable manner.

Alternatively, the transmission of lighting effects from the external storage facility 214A/214B to the central controller 202 may be prompted by a request for lighting effects issued by the central controller 202 to the external storage facility 214A/214B. The request may be generated in any suitable manner in response to any suitable condition, such as a periodic request sent at a regular interval similar to the periodic transmission discussed above. A response to a request may contain any suitable lighting effects stored on the external storage facility 214A/214B, including all lighting effects stored on the external storage facility 214A/214B, all lighting effects stored on the external storage facility 214A/214B since the last request, one or more lighting effects distinguished as special in some manner (e.g., a special effect or show of the day/month/etc.), or any other suitable set of one or more lighting effects.

In some embodiments of the invention, a request generated by the central controller 202 and sent to the external storage facility 214A/214B may be generated in response to one or more inputs from a user of the lighting system 200. A user of the lighting system may instruct the central controller 202 in any suitable fashion (e.g., via local user interface 210) to request any suitable set or sets of lighting effects (or indications thereof) either stored internally to the central controller 202 or one or more external storage facilities 214A/214B. For example, a user may request that the central controller 202 retrieve all new lighting effects from the external storage facility 214A/214B (i.e., all lighting effects which have been stored on the external storage facility 214A/214B since the last transmission from the external storage facility 214A/214B to the central controller 202). Alternatively or additionally, the central controller 202 may be adapted to receive from a user via the local UI 210 one or more inputs (i.e., user input information) regarding a desired lighting effect or show, and the central controller 202 may request that the external storage facility 214A/214B transmit lighting effects (or indications thereof) which are in some manner related to the user's input information.

In another embodiment, a user may change the contents of the external storage facility 214A/214B and/or the contents of central controller 202 (which may locally store lighting effects) by storing additional lighting effects or deleting existing lighting effects. Additional lighting effects may be modified versions of existing effects retrieved from the library. A method may allow users to create new or derived effects by mixing a number of existing effects. Known aggregation functions, such as averaging, may be used to automatically generate a new effect from a number of existing effects. Another method may support users to convert the state of lighting units 100 into a lighting effect.

Figure 3:
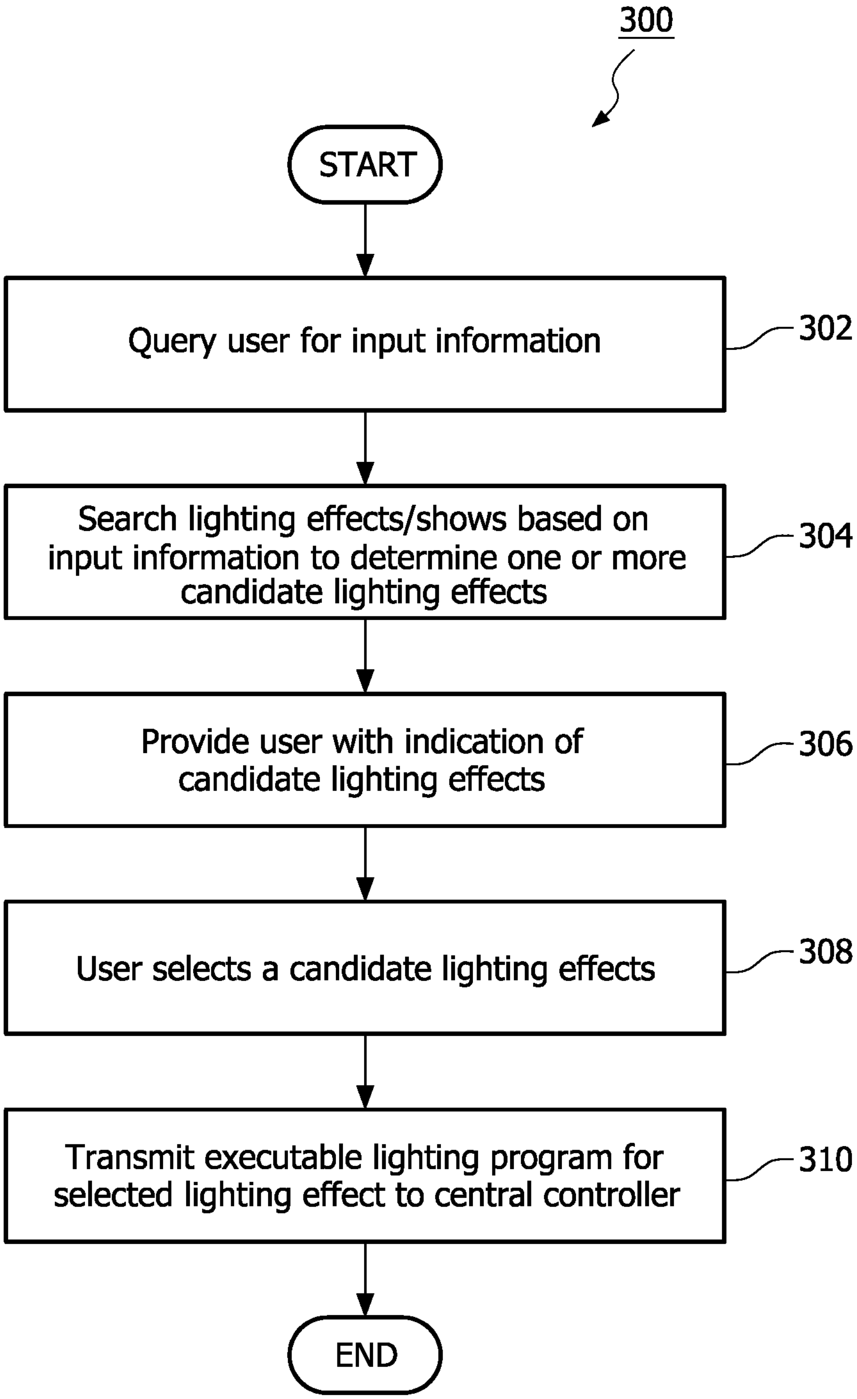
FIG. 3 is a flowchart of an illustrative process for selecting one or more lighting effects to be downloaded to a controller of an exemplary lighting system, in accordance with one embodiment of the present invention.
Figure 4:
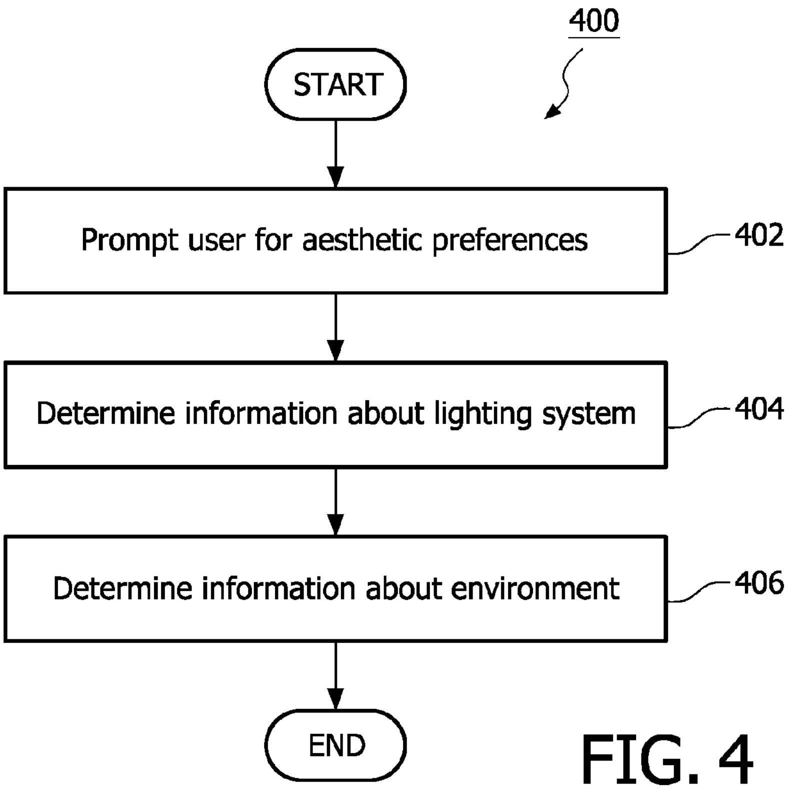
FIG. 4 is a flowchart of an illustrative process for collecting input information related to a desired lighting effect from a user, a lighting system, and an environment, in accordance with one embodiment of the present invention.
Figure 5:
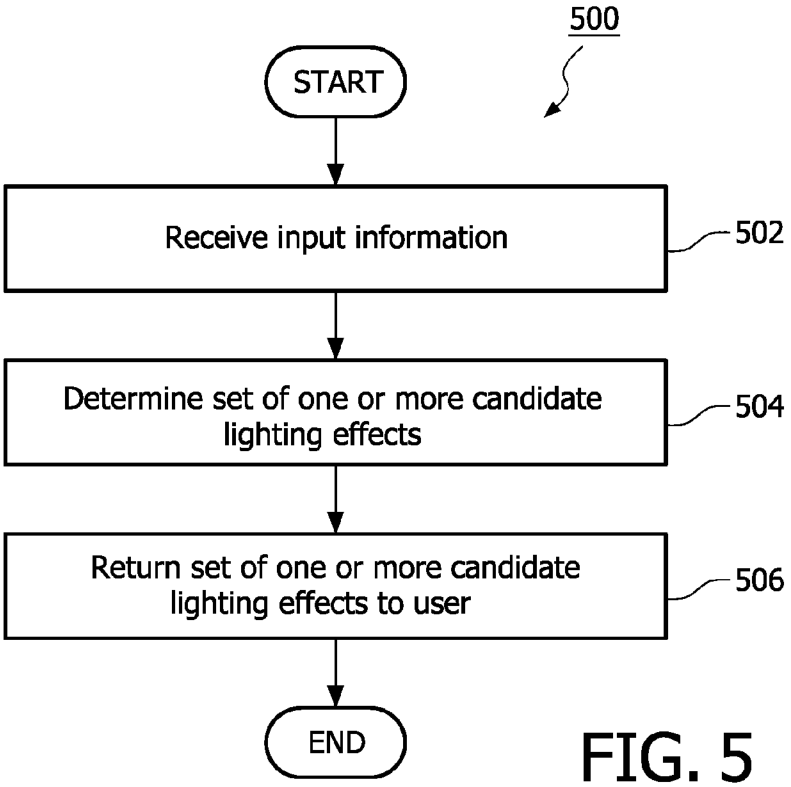
FIG. 5 is a flowchart of an illustrative process for determining one or more candidate lighting effects to be presented to a user, in accordance with one embodiment of the invention.

FIGS. 3, 4 and 5 show exemplary processes that may be implemented, for example, in whole or in part by the central controller 202 of FIG. 2. In particular, FIG. 3 illustrates an exemplary process for retrieving authored lighting effects/shows from the external storage facility 214A/214B according to input information obtained from a user (e.g., a designer, programmer or operator of the lighting system 200). The process 300 of FIG. 3 begins in block 302, wherein a user is prompted or queried for input information. A user may be prompted by any suitable device, such as by a GUI associated with the local user interface 210 of the central controller 202, and in any suitable manner. In some implementations, a user may enter various desired characteristics of lighting effects (e.g., one or more desired colors) into a search form. In alternative implementations, a "wizard" may be employed as part of a user interface, in which a user may be issued a plurality of prompts with directed queries asking for input information specific to a particular characteristic of a desired lighting effect (i.e., the user is led through a sequence of dialogues to obtain the input information). Such "wizard" implementations may have one or more prompts for one or more separate characteristics, such as a prompt for colors, a prompt for dynamicity (e.g., changing rapidly or changing slowly), a prompt for an arrangement of lights in the lighting system, or any other suitable prompt.

In block 304, the input information is used to search lighting effects stored internally to the central controller 202 and/or on the external storage facility 214A/214B to determine a set of one or more lighting effects which have characteristics or attributes that are related in some manner to the input information provided by the user in block 302. A search of the external storage facility 214A/214B may be performed in any suitable manner. For example, an information retrieval system such as a search engine may be implemented by the central controller 202 or another processing facility coupled to the central controller (e.g., via the network connections 204 or 206) which may be adapted to search internal memory of the central controller and/or another data store such as the external storage system 214A/214B according to any suitable algorithm. A search engine may be implemented as a part of the external storage facility 214A/214B, or may be implemented as another component in the lighting system 200, such as another component coupled to the communication network 206, and be adapted to search the external storage facility 214A/214B and/or a data store of information related to the information stored in the external storage facility 214A/214B. Embodiments of the invention may implement any suitable search engine or other information retrieval system, as the aspects of the invention described herein are not limited in this respect. A search engine may take as input one or more criteria in any one or more format(s), including text (e.g., words or sentences), documents, pictures, sounds, etc. In response to an input, a search engine may compare the input to a data store of information according to any one or more of many known algorithms to determine a set of results which are related to the input information in some manner. The search engine may determine results by analyzing metadata, previously stored in a data store such as an index, about a set of information to be searched, or may determine results "on the fly" by analyzing information dynamically and comparing the information to the input.

A search engine or other information retrieval system may implement any one or more suitable search engine algorithms, such as a probabilistic, Boolean, generic query, and/or ranking algorithm to match input to a data store, and may maintain a data store of information about the lighting effects/shows stored internally to the central controller or on or in association with external storage facility 214A/214B in any suitable manner, such as according to crawler/spider and/or indexing techniques. The data store of information about the lighting effects which is searched may store any suitable type or types of information, such as an index of one or more searchable attributes that are associated with one or more characteristics of lighting effects. For example, a lighting effect may have one or more searchable attributes for one or more colors generated by the lighting effect. Exemplary searchable attributes and characteristics for lighting effects, as well as techniques for establishing and searching them, are discussed in greater detail below.

The search engine, in block 304, determines from its search one or more lighting effects that have characteristics similar to those specified by the input information of block 302. These one or more lighting effects that are results of the search of block 304 are candidate lighting effects because they will be presented to the user of the lighting system 200 (who entered the input information in block 302) and the user may select one or more of the candidate lighting effects as effects for which the executable lighting program should be transmitted to the central controller 202 (and the corresponding lighting effect presumably generated by the lighting system 200 at some future time). It should be appreciated that the one or more candidate lighting effects provided in block 306 may contain information that is specific to lighting units 100 used in lighting system 200, in order to enable central controller 202 and/or lighting unit controller 208A, 208B, 208C and/or 208D to control the lighting system accordingly. Further, the one or more candidate lighting effects provided in block 306 may contain information that is independent of lighting units 100 used in lighting system 200. Specific information about the control of lighting units 100 according to the one or more candidate lighting effects may then be transmitted in block 310 and/or processed by central controller 202 and/or processed by lighting unit controller 208A, 208B, 208C and/or 208D. Therefore, it should be appreciated that any of the one or more candidate lighting effects provided in block 306 contain at least one type of information selected from the type of lighting unit specific information and lighting unit independent information.

In block 306, indications of the one or more candidate lighting effects are provided to the user. For example, a display associated with the user interface 210 of the central controller 202 may provide output information comprising one or more identifications of one or more candidate lighting effects. In one aspect as discussed in greater detail below, the manner of presenting the output information (e.g., search results) may include a ranking of the output information based on relevancy to the input information provided by the user. The user may review the output information and, in block 308, may select one or more for which the executable lighting program should be transmitted to the central controller 202. An indication of the candidate lighting effects selected by the user is transmitted to the search engine and/or the external storage facility 214A/214B, and in block 310 the executable lighting programs for the one or more selected candidate lighting effects is transmitted to the central controller 202.

Once the executable lighting program for a candidate lighting effect/show is on the central controller 202, then the lighting effect may be generated by the lighting system 200 and/or the lighting effect may be modified by the user of lighting system 200 to produce a lighting effect different from the lighting effect transmitted to the central controller in block 310. For example, the user may change one of the colors produced by the lighting effect/show, change a reproduction speed for the lighting effect, or change any other characteristic of the lighting effect. Further, if a user selects multiple lighting effects in block 308, the user may, in some embodiments, be able to create a new lighting show by combining two or more of the selected lighting effects with one another and/or with lighting effects which were previously stored on the central controller 202. The new lighting show may be a pure combination of lighting effects, or may comprise additional lighting effects added by the user which are not a part of the lighting effects retrieved from the external storage facility 214A/214B. Additionally, once an executable lighting program for a lighting effect has been received and/or modified by a user, then the central controller 202 may transmit the executable lighting program to a data store associated with the central controller 202. The data store associated with the central controller 202 may be a part of the central controller 202 or may be accessible by the central controller 202 over one or both of networks 204 and 206.

It should be appreciated that the process 300 shown in FIG. 3 is merely exemplary and that embodiments of the invention are not limited to implementing a process such as process 300 and that other processes are possible. For example, while process 300 is described as collecting information from a user in block 302 through a single or repeated queries, in some embodiments of the invention, some or all of the input information may be additionally or alternatively derived from the central controller 202 or from automatic detection in the lighting system 200, or from an environment in which the lighting system 200 is implemented.

FIG. 4 shows an exemplary process 400 for accepting input information from a user, the lighting system 200, and/or an environment in which the lighting system is disposed and one or more lighting effects/lighting shows are to be generated. Process 400 begins in block 402, wherein a user's aesthetic preferences may be determined, for example, via the user's input information. The input information may specify a certain color as well as a color palette or range of colors or type of colors (e.g., very bright colors or very subdued colors) the user prefers. As a further example, a desired intensity of a lighting effect may be determined. An intensity of a lighting effect may be determined based on a desired purpose of the lighting effect; in circumstances a user may want a subtle lighting effect to accent an environment, while in others the user may want the lighting effect to be the primary stimulus in an environment (e.g., a fast, bright strobe rather than a soft, static light).

Accordingly, the process 400 may also determine in block 402 from the user input information a purpose for the lighting effect. For example, if the lighting effect is to be set to another audio or visual stimulus (such as music or a video), the user's input information may include information regarding the audio or visual stimulus (e.g., a tempo of a song). Additionally, the user's desired mood may be specified. This may be related to the user's color and intensity preferences, but may also be used to determine other properties of the lighting effect. Exemplary moods that may be determined from a user are an energetic mood, a soothing mood, and a bright and airy mood, among others.

To determine the aesthetic preferences in block 402, a user may input information in any suitable manner. In some embodiments of the invention, a user may be issued one or more prompts regarding aesthetic preferences. For example, a user may be issued a single prompt into which the user may enter keywords regarding each of the user's aesthetic preferences. Alternatively, a user may be issued multiple prompts in an interface similar to a "wizard," each corresponding to a specific type of aesthetic preference (e.g., there may be a prompt for a color and/or color range, a prompt for dynamicity (how much or how fast a lighting effect changes), a prompt for mood, and/or any other suitable prompt).

In some embodiments of the invention, the aesthetic preference information gathered from the user in a determination process such as block 402 of process 400 may be stored by the central controller 202 and/or by a component executing process 400 such that it may be used in the future to determine a user's desired illumination type without having to repeat the determination process. The central controller 202 may be adapted to determine (i.e., learn) the illumination preferences of one or more users based on one or more sets of information on desired illumination types. Further, the central controller 202 may determine illumination preferences based on lighting effects selected or not selected for implementation, or on a user's collected votes regarding lighting effects presented. Illumination preferences may be based on any of the characteristics of illumination discussed above (color, desired mood, purpose, and intensity), as well as any other characteristics of illumination that may be analyzed and stored by a central controller 202. The central controller 202 may be adapted to make guesses about a user's illumination preferences based on the user's first input regarding a desired illumination type, and may be adapted to refine those guesses based on further input regarding desired illumination types. Thus, the central controller 202 and the external storage facility 214A/214B may be adapted to present a list of candidate lighting effects to a user without implementing a block 402 of process 400 by analyzing the user's past illumination preferences.

In block 404, characteristics of a lighting system are determined. The characteristics of the lighting system may be input by a user in response to prompts, and/or may be detected automatically by the central controller 202 from the lighting system 200. For example, in some embodiments of the invention, a user may input all necessary information regarding the number, type(s), and arrangement of lighting units 100. The user may enter this information into a prompt by specifying, for each lighting unit, the lighting unit's location (e.g., coordinates in a system, or distance from a specified point in the environment, and orientation of the lighting unit) and type. In another example, the user may enter the information in a more simplified manner, such as by specifying a simple configuration of the lighting units, such as simply whether the lighting units are arranged in a line, a two-dimensional array (i.e., a grid), or non-linear/non-grid scatter arrangement, and may enter the number of lighting units and simple type information (e.g., cove lights or wash lights). Alternatively, the users may enter this information into a two-dimensional or three-dimensional computer-simulated lighting environment by placing icons for a lighting unit into a simulated environment and entering into the simulation properties of the lighting unit (i.e., information regarding the type of each lighting unit), or may enter the information in any other suitable manner.

As another example of the actions taken in block 404, in some embodiments of the invention the central controller 202 automatically determines a number of the lighting units 100 of the lighting system 200 that are available to generate a lighting effect, as well as the respective types of lighting units, and/or physical arrangement of the lighting units in a given environment. In other implementations, the central controller may be adapted to receive as input a picture such as a photograph of a lighting system 200, from which the central controller 202 may determine the type, orientation, and placement of the lighting units 100, and then input the information into the process 400 at block 404. In some embodiments of the invention, in addition to or as an alternative to a photograph, the central controller may accept a video of the lighting system 200 from which it may identify the number, type(s), and locations of lighting units 100. In some such embodiments of the invention, the central controller 202 may be connected to a video capture device and may determine the number, type(s), and locations of the lighting units 100 by generating lighting effects using the lighting units 100, capturing a video of the lighting effects with the video capture device, and analyzing the resulting video data to determine the information about the lighting units 100. For example, the central controller 202 may instruct a lighting unit 100 to generate a particular type of illumination and may instruct other lighting units not to generate any illumination, and from the video the central controller 202 may be able to identify the location and type of designated lighting unit 100, as it is the only lighting unit lit in the lighting system 200. A lighting unit's type may be determined in any suitable manner, such as by determining what types of illumination it is capable of generating by instructing it to generate a range of lighting effects or in any other suitable manner.

As a further example of ways in which information about the lighting units 100 may be input in block 404, lighting units 100 may be made available to users along with instructions regarding one or more pre-defined layouts that may be stored on any suitable medium, such as a computer-readable medium like a flash memory card or a CD-ROM. The instructions may be in any suitable format, such as a two-dimensional or three-dimensional representation of the pre-defined layout, a text description of the layout, or any other method of storing layout information. The instructions may direct the user to place particular lighting units in particular locations, such that the lighting system 200 matches the pre-defined layout. The information provided in block 404 may then be any suitable indicator of the pre-defined layout, such as a serial number for a layout. The indicator for the pre-defined layout may be stored in any suitable manner, such as by each of the lighting units 100 or in a dedicated memory for the lighting system 200 such as central controller 202.

As another example of a manner of collecting information about the lighting units 100, central controller 202 may be configured to automatically detect the number, type(s), and/or locations of lighting units 100. For example, in some embodiments of the invention, lighting units 100 may be assigned addresses in a wired and/or wireless network, and the central controller 202 may detect a number of lighting units 100 by sending out probes to each address in a range of addresses and waiting for a response from the address. If a lighting unit responds to a probe, then the probed address is assigned to the lighting unit. A response to the probe may be a simple acknowledgement of existence of the lighting unit, in which case the central controller may follow the probe with requests for information on the lighting units type and/or location, or the response from the lighting unit may comprise information on the lighting unit's type and/or location. In some embodiments of the invention, lighting units may be joined together in groups, such as in strings of lighting units, and may have a base lighting unit that contains information on the group. The central controller 202 may then request from the base lighting unit information regarding the number and type of lighting units in the group, as well as location information for the individual lighting units in the group.

Location information may be automatically determined by the lighting system 200 in any suitable manner. In some embodiments of the invention, lighting units may be adapted to determine their location using any suitable self-localization system. For example, each lighting unit may be equipped with a device for determining its position in a space, such as a Global Positioning System (GPS) receiver or similar device using, for example, time difference of arrival (TDOA) analysis on multiple signals generated at precise times. In alternative embodiments of the invention, the lighting system 200 may be equipped with beacon-generating devices which send out a beacon signal, and each lighting unit may be adapted to determine its position in the environment by analyzing the Received Signal Strength (RSS) of the beacon signal, using any known RSS technique. RSS operates by estimating the distance a signal traveled from its source by analyzing the drop in its strength. It should be appreciated that embodiments of the invention are not limited to implementing any particular technique for automatically determining the number, type(s), or locations of lighting units in an environment, as embodiments of the invention may implement any suitable technique or techniques for determining this information.

As a last example, process 400 may be configured to accept in block 404 the information about the lighting units 100 in a hybrid manner that is partially automatic and partially user-driven. In some embodiments of the invention, the central controller 202 may detect the existence and types of the lighting units 100, but may rely on the user to enter the locations of each of the lighting units. The locations may be entered in any suitable manner, including any of the ways discussed above, such as a table of values or a two-dimensional or three-dimensional simulation. Further, process 400 may be configured to accept in block 404 the information about the lighting units 100 as well as their current lighting settings (e.g. color, brightness). In some embodiments of the invention, central controller 202 may collect this type of information. It is appreciated that the information thus accepted in block 404 may serve as some of the searchable attributes (to indicate an example of the lighting effect that the user may be searching for).

It should be appreciated that the foregoing examples are merely illustrative, and that embodiments of the invention are not limited to implementing any particular process for accepting input in block 404 regarding the lighting system 200 (including the number, type(s), and locations of lighting units 100). Embodiments of the invention may implement any of the above-described processes or any other suitable process.

In block 406, the process 400 may determine one or more characteristics of the environment in which the lighting system 200 is implemented. This may be any suitable information about the environment, such as size, shape, and location of the physical environment, a time a lighting effect is being or is to be generated, and/or an event or occasion corresponding to the physical space and/or time (e.g., a holiday or party type). This information may be input by a user, detected by or from the lighting system 200 (e.g., determined from placement of lighting units 100), or determined in any other suitable manner. Information about the environment may further include intensity and/or spectrum of daylight in a physical space, presence of specific sensors or actuators, sound, temperature, number of people or activity of people (e.g. moving around or remaining in one specific location) inside a physical space. A weighing factor may be assigned to one or more of the environmental inputs.

Further, it should be appreciated that block 404 and/or block 406 may be implemented at different stages in process 300. In particular, block 404 and/or block 406 may be implemented before block 304, in order to provide a more specific search based on information about the lighting system and/or environment. Such a search may yield an improved indication of candidate lighting effects in block 306, or limit the amount of suitable lighting effects provided to the user in block 306, thus reducing the selection burden to the user. Further, by implementing block 404 and/or block 406 in process 300 before at least block 310, an enhanced executable lighting program may be transmitted in block 310, thus reducing the processing burden of a central controller 202.

In an exemplary embodiment, the current temperature in a physical space is determined in block 406. This information is then used to provide the user in block 306 with an enhanced indication of candidate lighting effects, or to transmit an enhanced executable lighting program in block 310. In another exemplary embodiment, the temperature profile over 24 hours in a physical space is determined in block 406. This information is then used to provide the user in block 306 with an enhanced indication of candidate lighting effects, which vary over time, or to transmit an enhanced executable lighting program in block 310. It should be appreciated that momentary information about the environment determined in block 406 may be expanded to predict a profile over time (e.g. by extrapolation of previously determined information), in order to provide enhanced lighting effects, which vary over time, in block 306 and/or block 310. By example, such variations of lighting effects over time may be repeated periodically, expire after a certain amount of time (e.g. at the end of the summer), or expire after a trigger determined in block 406.

Further, it should be appreciated that embodiments of the invention may take any suitable characteristics of a lighting effect or lighting system as input information, and that the characteristics discussed above in conjunction with FIGS. 3 and 4 are merely exemplary. For example, a user may input aesthetic preferences such as a desired color to be generated by the lighting effect/show, and/or a color palette or range of colors to be generated. A user may additionally or alternatively enter a desired dynamicity of the lighting effect/show (i.e., how much and/or how fast the lighting effect should change), and/or a desired mood to be generated by the lighting effect. A user may also input, or the central controller could detect automatically, a number of lighting units 100 in the lighting system 200, types of the lighting units 100 in the lighting system 200, and/or a physical arrangement of lighting units 100 in the environment in which lighting system 200 is implemented. Additionally or alternatively, characteristics of the environment could be input or detected, such as a shape or size of a physical space in which the lighting system 200 is implemented and the lighting effect/show is to be generated, a time at which the lighting effect is to be generated in the environment (day/night, winter/summer, etc.), and/or an occasion or event for which the lighting effect is going to be generated. An occasion or event may be, for example, a holiday such as a Fourth of July party or Christmas party for which certain characteristics of lighting effect may be appropriate (e.g., red/white/blue for the Fourth of July and red/ green for Christmas, or rapidly-changing, fireworks-like effects for the Fourth of July and smooth, subdued transitions for Christmas).

Once information about a desired lighting effect has been input (by querying a user for aesthetic preferences and/or automatically detecting properties of a lighting system and/or environment) the information may be used to determine one or more candidate lighting effects/shows from the set of lighting effects/shows stored in the central controller 202 and/or the external storage facility 214A/214B. This may be done in any suitable manner. Process 500 of FIG. 5 is one exemplary process for making this determination. Process 500 begins in block 502, wherein input information is received. In block 504, the input information is used to determine one or more candidate lighting effects which may be, for example, lighting effects or shows which have properties similar to (e.g., in some manner related to) the input information. In block 506, the set of one or more candidate lighting effects is returned to the user, and the process ends.

The determination of block 504 of one or more candidate lighting effects/shows may be made in any suitable manner. In some embodiments of the invention, a search engine may be implemented to determine a set of candidate lighting effects. As discussed above, any suitable search engine searching any suitable data store or data stores may be implemented, as the embodiments of the invention which implement a search engine are not limited in this respect. In some embodiments of the invention, each of the authored lighting effects/shows stored in the central controller and/or external storage facility 214A/214B may be associated with one or more searchable attributes, and the search engine may be adapted to compare the input information to the searchable attributes of the authored lighting effects/shows. The searchable attributes may relate to any one or more characteristics of a lighting effect/show, and may be implemented in any suitable manner, such as in a textual description of a lighting effect/show, a function or instruction of an executable lighting program to generate the lighting effect/show, or one or more labels or tags associated with a lighting effect.

Any suitable characteristic of a lighting effect may be described by a searchable attribute associated with the lighting effect. For example, a color content of light which is generated by a lighting effect, an optimal unit-to-unit distance for the lighting effect (i.e., an optimal resolution of the lighting units 100), a color distribution/spatial frequency of light to be generated (i.e., the range of colors generated), at least one dynamic temporal characteristic of the light to be generated (e.g., how fast an effect changes color, intensity, etc.), an optimal viewing perspective of a viewer of the light (e.g., in front of the lighting units, below the lighting units, behind the lighting units as in a projection setting, etc.), at least one preferred object to be illuminated by the light (such as for lighting effects designed for particular environments, such as illuminating jewelry in a commercial display), an optimal geometric configuration of lighting units suitable for generating the lighting effect (e.g., whether lighting units should be in an array, a line, scattered throughout an environment, etc.), or any other suitable characteristic. It should be appreciated that these characteristics are merely illustrative of the characteristics that may be described by searchable attributes, and that embodiments of the invention implementing a search engine searching searchable attributes are not limited to implementing any specific searchable attribute or sets of searchable attributes.

In embodiments of the invention implementing a search engine that searches for searchable attributes of characteristics of a lighting effect, the searchable attributes (whether stored as text, tags/labels, or in any other suitable manner) may be determined by any suitable technique. In some embodiments of the invention, when an authored lighting effect is stored in the central controller and/or the external storage facility 214A/214B, an author of the authored lighting effect may, using the light system composer 212, specify the searchable attributes for the authored lighting effect (e.g., may associate one or more tags with the authored lighting effect). As a further alternative, once an executable lighting program for an authored lighting effect is stored in the external storage facility 214A/214B, the executable lighting program may be automatically executed to determine one or more characteristics of the lighting effect generated by the executable lighting program. For example, a component of the lighting system 200 or of the external storage facility 214A/214B may generate the lighting effect using the executable lighting program and may monitor the generated illumination to determine one or more characteristics of the lighting effect, or the component may simulate the lighting effect in any suitable manner and monitor illumination generated in the simulation. Alternatively, the central controller and/or the external storage facility 214A/214B may analyze the executable lighting program, without executing it, to determine one or more characteristics. For example, a component of the lighting system 200 or of the external storage facility 214A/214B may perform a Fast Fourier Transform (FFT), or perform any other suitable analysis algorithm, to determine a rate of change in illumination or overall degree of change in illumination. It should be appreciated that these techniques are merely exemplary, and embodiments of the invention which allow users to upload data about lighting effects may determine characteristics of the lighting effects in any suitable manner.

In embodiments of the invention which implement a search engine that compares searchable attributes to input information to determine one or more candidate lighting effects, a comparison may be made in any suitable manner. For example, the search engine may query a data store for an exact match between a piece of input information and a searchable attribute. For example, if a user inputs that he or she is looking for candidate lighting effects which has a specific property (e.g., generates red light) then the search engine may look for lighting effects which have one or more searchable attributes specifying that the lighting effect has that property (e.g., generate red light). Alternatively or additionally, the search engine may look for candidate lighting effects which have searchable attributes similar to the input information (e.g., the user indicates a desire for red light, and the search engine may return lighting effects which generate pink light). When the input information (e.g., from the user and/or the lighting system) comprises multiple pieces of information, the search engine may search for lighting effects having searchable attributes that match all of the input information, most of the input information, at least one piece of the input information, or in any other suitable manner. Further, in some embodiments of the invention, the search engine may provide a ranking of candidate lighting effects as a result of the query. A ranking may be done in any suitable manner, such as by how closely the searchable attributes of a lighting effect match the input information. For example, a lighting effect which has searchable attributes that exactly match the input information may be deemed by the search engine a “better” match than a lighting effect that matches only part of the input information or is a close match rather than an exact match (e.g., the lighting effect generates pink light when the input information specifies red light).

The lighting effects can be associated with or tagged with additional or auxiliary information. Such information may include images, movie clips, or textual descriptions, as well as the type of required lamps or the envisioned resulting mood of a user. This additional information may be used by the user for selecting from the presentation of a set of one or more candidate lighting effects. Further, this information may be employed as some of the searchable attributes. In some of these embodiments, this information is provided by the user. In other embodiments, the lighting system 200 may derive said additional information from the lighting effect, the state of lighting units 100, or the physical space in which the lighting effect is rendered. In one embodiment, said additional information comprises a picture, created by the lighting system 200, of the physical space where the lighting system 200 has rendered the lighting effect. In some embodiments the lighting system 200 provides a mechanism for the user to input said additional information, e.g. through a keyboard, microphone, camera, USB port, or any other modality.

As discussed above, once a set of one or more candidate lighting effects has determined by, for example, a search engine or other information retrieval system, the candidate lighting effects may be presented to a user. The user may review the candidate lighting effects and issue a new search and/or select one or more candidate lighting effects for which the executable lighting program may be retrieved and executed by the central controller 202 to generate the selected lighting effect. In an exemplary embodiment in which a set of one or more candidate lighting effects are presented to a user, the presentation may include recommendations that are derived from the use of similar lighting effects by other users. Furthermore, the presentation may include evaluation information from other users.

Embodiments of the invention may act in any suitable computer system. For example, in some embodiments of the invention, an external storage facility 214A/214B may be a computer-readable storage medium local to or associated with the central controller 202, and the search engine or other information retrieval system may be implemented as executable instructions (e.g., software) on the central controller 202. In such examples, the external storage facility 214A/214B may be a hard disk drive or Digital Versatile Disk (DVD) having lighting effects which may be searched and from which executable lighting programs may be retrieved. In such embodiments, an act of transmitting information from the external storage facility 214A/214B to the central controller 202, as described above, may comprise the information being retrieved by the central controller 202. In alternative embodiments of the invention, the external storage facility 214A/214B may be implemented as a remote data store of information with which the central controller 202 may interact in any suitable manner. For example, a web server may be disposed in the lighting system 200 and coupled to the network 206. A user may then request, via the local UI 210 of the central controller 202, that the web server transmit a web page to the central controller 202. The web page may comprise a search engine interface to the external storage facility 214A/214B, and the web page may retrieve from the user and/or lighting system 200 any suitable input information that may be used in determining one or more candidate lighting effects according to any of the techniques discussed above. Once the input information has been input to the search engine by the web page, the search engine may search the external storage facility 214A/214B in any suitable manner to determine one or more candidate lighting effects. The web server may then transmit to the central controller 202 at least one other web page to display the candidate lighting effects to the user. From this at least one other web page, the user may make a selection of one or more lighting effects for which the executable lighting program should be retrieved, and the executable lighting program may be sent to the central controller 202 by the web server and/or external storage facility 214A/214B.

Additionally, it should be appreciated that any of the above-described functions and techniques may be implemented as computer-executable instructions which may be stored on a computer-readable storage medium associated with any component of lighting system 200, and which may be executed by a processor of any component of lighting system 200. A component of the lighting system 200 may be any component shown in FIG. 2 and/or any suitable computing device which may be coupled to the lighting system 200 via, for example, one or both of networks 204 and 206.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention. Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for facilitating design, selection or customization of at least one lighting effect, the method comprising:

A. querying a user for input information;

B. searching a plurality of indexed predefined lighting effects based at least in part on the input information, each lighting effect of the plurality of lighting effects having at least one searchable attribute associated therewith, wherein step B comprises:

(B1) determining when at least one first searchable attribute associated with at least one first lighting effect of the plurality of lighting effects is related to the input information; and, when said at least one first searchable attribute associated with at least one first lighting effect of the plurality of lighting effects is related to the input information;

(B2) identifying the at least one first lighting effect as at least one candidate lighting effect;

C. providing output information comprising an identification of the at least one candidate lighting effect identified in step B2; and D. automatically determining at least one aspect of a lighting system available to generate the at least one lighting effect for execution by the lighting system by a controller;

wherein step B comprises searching the plurality of indexed predefined lighting effects based at least in part on the input information and the at least one aspect of the lighting system determined in step D; and wherein the candidate lighting effect identified in step B2 is based at least in part on the at least one aspect of the lighting system determined in step D.

2. The method of claim 1, wherein the lighting system includes a plurality of lighting units, and wherein step D comprises automatically determining a number of the lighting units, respective types of the lighting units, or a physical arrangement of the lighting units in an environment in which the at least one lighting effect is to be generated.

3. The method of claim 1, wherein the input information relates to at least one aspect of said lighting system available to generate the at least one lighting effect.

4. The method of claim 3, wherein the lighting system includes a plurality of lighting units, and wherein the input information relates to at least two of a number of the lighting units, respective types of the lighting units, or a physical arrangement of the lighting units in an environment in which the at least one lighting effect is to be generated.

5. The method of claim 1, wherein the input information relates to at least one aesthetic preference of the user regarding a characteristic of light to be generated in the at least one lighting effect.

6. The method of claim 5, wherein the at least one aesthetic preference relates to at least two of a desired color of the light, a desired color palette or range of colors for the light, a desired dynamic characteristic of the light, or a desired mood to be created by the light.

7. The method of claim 1, wherein the input information relates to at least one aspect of an environment in which the at least one lighting effect is to be generated.

8. The method of claim 7, wherein the input information relates to a physical space in which the at least one lighting effect is to be generated.

9. The method of claim 7, wherein the input information relates to an occasion or an event for which the at least one lighting effect is to be generated.

10. The method of claim 1, wherein the at least one first searchable attribute relates to:

i. a color content of light to be generated in the at least one first lighting effect;

ii. a color resolution of the light to be generated in the at least one first lighting effect;

iii. a color distribution or color spatial frequency of the light to be generated in the at least one first lighting effect;

iv. at least one dynamic temporal characteristic of the light to be generated in the at least one first lighting effect;

v. a viewing perspective of a viewer of the light to be generated in the at least one first lighting effect;

vi. at least one preferred object to be illuminated by the light to be generated in the at least one first lighting effect; or vii. a geometric configuration of a plurality of lighting units suitable for generating the at least one first lighting effect.

11. The method of claim 10, wherein the at least one first searchable attribute relates to the geometric configuration of the plurality of lighting units suitable for generating the at least one lighting effect, and wherein the geometric configuration is selected from the group consisting of a one dimensional configuration, a two dimensional configuration, a three dimensional configuration, and a random configuration.

12. The method of claim 10, wherein the at least one first searchable attribute relates to the at least one dynamic temporal characteristic of the light to be generated in the at least one first lighting effect, and wherein the at least one dynamic characteristic relates to an appearance of motion in the at least one first lighting effect.

13. The method of claim 1, wherein the at least one searchable attribute associated with each lighting effect of the plurality of indexed predefined lighting effects is identified by at least one searchable tag, and wherein step B1 comprises determining when at least one first searchable tag associated with the at least one first lighting effect corresponds to at least some of the input information.

14. The method of claim 1, wherein the at least one first lighting effect determined in step B1 includes a plurality of first lighting effects, wherein step B2 comprises identifying the plurality of first lighting effects as a plurality of candidate lighting effects, wherein the output information provided in step C comprises the identification of the plurality of candidate lighting effects, and wherein the method further comprises step E allowing the user to select at least one desired candidate lighting effect from the plurality of candidate lighting effects.

15. The method of claim 14, further comprising executing at least one lighting program so as to generate the at least one desired candidate lighting effect when selected in step E.

16. The method of claim 15, further comprising transferring from a first storage medium to a second storage medium at least one lighting program that, when executed, generates the at least one desired candidate lighting effect, when selected in step E.

17. The method of claim 15, further comprising allowing the user to modify the at least one desired candidate lighting effect when selected in step E.

18. The method of claim 15, wherein the at least one desired candidate lighting effect includes at least two desired candidate lighting effects, and wherein the method further comprises allowing the user to combine the at least two desired candidate lighting effects.

19. The method of claim 14, wherein step C further comprises associating the at least one desired candidate lighting effect with an auxiliary information.

20. The method of claim 19, wherein the auxiliary information includes at least one image.

21. The method of claim 1, wherein the method is an Internet enabled method further comprising providing the plurality of indexed predefined lighting effects on a web site, wherein step A comprises receiving the input information from the user over the Internet; and step B comprises providing the output information to the user over the Internet.

* * * * *